(12) United States Patent
Wang et al.

(10) Patent No.: US 12,372,352 B2
(45) Date of Patent: Jul. 29, 2025

(54) DEVICE FOR OBSERVING AND POSITIONING SHARPENING ANGLE OF CUTTING EDGE

(71) Applicant: SHARPAL, INC., Ontario, CA (US)

(72) Inventors: Jianhua Wang, Shanghai (CN); Lei Fang, Shanghai (CN); Xiuying Wang, Shanghai (CN); Liping Ying, Shanghai (CN)

(73) Assignee: SHARPAL, INC., Ontario, CA (US)

( * ) Notice: Subject to any disclaimer, the term of this patent is extended or adjusted under 35 U.S.C. 154(b) by 331 days.

(21) Appl. No.: 18/127,910

(22) Filed: Mar. 29, 2023

(65) Prior Publication Data

US 2023/0314132 A1 Oct. 5, 2023

(30) Foreign Application Priority Data

Apr. 1, 2022 (CN) .......................... 202210338176.2

(51) Int. Cl.
*G01C 9/34* (2006.01)
*B24D 15/08* (2006.01)

(52) U.S. Cl.
CPC ............... *G01C 9/34* (2013.01); *B24D 15/08* (2013.01)

(58) Field of Classification Search
CPC ........................................................ G01C 9/34
USPC ......................................... 33/347, 354, 384
See application file for complete search history.

(56) References Cited

U.S. PATENT DOCUMENTS

| 2,757,458 | A | * | 8/1956 | Zipser | G01C 9/24 33/388 |
| 3,009,250 | A | † | 11/1961 | Schock | |
| 5,063,679 | A | * | 11/1991 | Schwandt | B25F 5/023 33/388 |
| 5,430,952 | A | * | 7/1995 | Betts | G01B 3/1084 33/760 |
| 5,472,375 | A | * | 12/1995 | Pugh | B24D 15/06 451/367 |
| 6,536,125 | B2 | * | 3/2003 | Klapperich | B25H 7/02 33/472 |
| 7,269,907 | B2 | * | 9/2007 | Levine | G01C 15/004 33/286 |
| 7,299,560 | B2 | * | 11/2007 | Diaz | B43L 7/005 33/495 |
| 7,467,475 | B1 | † | 12/2008 | Cheek | |
| 7,540,933 | B2 | * | 6/2009 | Dugas | B44C 7/06 156/577 |

(Continued)

*Primary Examiner* — George B Bennett
(74) *Attorney, Agent, or Firm* — Vedder Price P.C.

(57) ABSTRACT

Provided is a device for observing and positioning a sharpening angle of a cutting edge. The device includes a spirit bubble for observing a change of a sharpening angle of a cutting edge and positioning the sharpening angle of the cutting edge, and a base for fixing the device on a knife body. The spirit bubble is rotatably connected to the base for adjusting an angle between the spirit bubble and the base. The device enables, in a dynamic process of grinding a cutting edge of a knife, a grinder to continuously remain in a correct sharpening angle range and grind the cutting edge in accordance with a correct sharpening angle of the knife when holding the knife to perform a grinding action, and also meets a requirement for controlling sharpening angles of cutting edges of knives with various edge shapes in respective edge grinding processes of the knives.

13 Claims, 17 Drawing Sheets

(56) References Cited

U.S. PATENT DOCUMENTS

| | | | | |
|---|---|---|---|---|
| 7,987,608 B2* | 8/2011 | Rowe | ........................ | G01C 9/24 |
| | | | | 451/371 |
| 8,590,170 B2* | 11/2013 | Wagner | ................ | G01B 3/1041 |
| | | | | 33/760 |
| 9,221,144 B2† | 12/2015 | Powell | | |
| 9,498,037 B2* | 11/2016 | Rodrigues | ............ | A45C 11/321 |
| 9,933,258 B2* | 4/2018 | Mitchell | ................ | G01C 25/00 |
| 10,675,736 B1* | 6/2020 | Boutorine | ............... | B24D 15/06 |
| 10,969,213 B1* | 4/2021 | Silberberg | ............... | G01C 9/34 |
| 10,976,159 B1* | 4/2021 | Silberberg | ............... | G01C 9/28 |
| 11,351,655 B1† | 6/2022 | Samuel | | |
| 12,202,093 B2* | 1/2025 | Domitrowski | ............ | G01C 9/28 |
| 2015/0174723 A1* | 6/2015 | Powell | .................. | B23Q 16/08 |
| | | | | 451/378 |
| 2016/0339591 A1* | 11/2016 | Sung | ........................ | B26B 1/02 |
| 2017/0173760 A1† | 6/2017 | Hourmand | | |
| 2024/0058923 A1* | 2/2024 | Klein | ........................ | B24B 3/36 |

\* cited by examiner
† cited by third party

DEVICE FOR OBSERVING AND POSITIONING SHARPENING ANGLE OF CUTTING EDGE

CROSS REFERENCE TO RELATED APPLICATIONS

This application claims the benefit of priority to Chinese Application No. 202210338176.2 filed Apr. 1, 2022, the content of which is hereby incorporated by reference.

TECHNICAL FIELD

The present invention relates to the technical field of knife sharpening aids, and more particularly to a device for observing and positioning a sharpening angle of a cutting edge.

BACKGROUND

An angle of a knife is likely to be deviated during a sharpening operation of a cutting edge of an existing knife, thereby resulting in an offset of a sharpening angle of the knife and damage or a poor use effect. Some existing knife sharpening aids (for example, an angle gauge) can only make limited static reference to an initial angle during the sharpening of the knife, cannot assist in correcting a hand-held sharpening angle of the knife in a sharpening action in real time, and also cannot display in real time whether the angle of the knife is deviated in a grinding action.

Although other existing knife sharpening aids (for example, a U-shaped angle device for clamping a spine) can fix an angle of a specific knife during the sharpening of a cutting edge of the knife, the knife grinding aids cannot be applied to knives corresponding to blade faces with different widths. The application range is small, and a part of the U-shaped angle device, located between the knife and a sharpening stone, is likely to generate friction with the sharpening stone during the sharpening of the knife, thereby causing damage to both the U-shaped angle device and the sharpening stone.

BRIEF SUMMARY OF DISCLOSURE

An object of the present invention is to provide a device for observing and positioning a sharpening angle of a cutting edge. The device for observing and positioning a sharpening angle of a cutting edge is provided in order to mainly solve the following problems in the prior art: 1, in a dynamic process of grinding a cutting edge of a knife, how to enable a grinder to continuously keep in a correct sharpening angle range and grind the cutting edge according to a correct sharpening angle or sharpening angle of the knife when holding the knife to perform a grinding action; and 2, how to meet a requirement for controlling sharpening angles of cutting edges of knives with various edge shapes (namely, knife body specifications with different widths and different sharpening angles) in respective edge grinding processes of the knives.

In order to achieve the foregoing object, the present invention adopts the following technical solution. The device for observing and positioning a sharpening angle of a cutting edge includes a spirit bubble for observing a change of the sharpening angle of the cutting edge and positioning the sharpening angle of the cutting edge, and a base for fixing the device on a knife body.

The spirit bubble is rotatably connected to the base for adjusting an angle between the spirit bubble and the base.

Further, the spirit bubble is axially rotatably connected to the base.

Further, the device includes a first bracket and a second bracket for fixing the spirit bubble. A first end of the base is rotatably connected to a first end of the second bracket. A second end of the base is rotatably connected to a second end of the first bracket. A first end of the first bracket is movably connected to the second bracket for adjusting the magnitude of a first included angle between the first bracket and the base.

Further, the first end of the base is axially rotatably connected to the first end of the second bracket. The second end of the base is axially rotatably connected to the second end of the first bracket.

Further, the base includes a first connecting section and a second connecting section. A second end of the first connecting section is connected to a second end of the second connecting section via a first connecting portion, so as to form a third recess portion for receiving the first bracket and the spirit bubble.

Further, the first bracket includes a third connecting section and a fourth connecting section. A first end of the third connecting section is connected to a first end of the fourth connecting section via a second connecting portion, so as to form a first recess portion for placing the spirit bubble.

Further, the second bracket includes a fifth connecting section and a sixth connecting section. A second end of the fifth connecting section is connected to a second end of the sixth connecting section via a fourth connecting portion, so as to form a second recess portion for matching the second connecting portion of the first bracket.

Further, the second end of the third connecting section is provided with a first auxiliary fixing portion for fixing the spirit bubble.

And/or the second end of the fourth connecting section is provided with a second auxiliary fixing portion for fixing the spirit bubble.

And/or a third auxiliary fixing portion for fixing the spirit bubble is disposed between the first end of the third connecting section and the first end of the fourth connecting section, and/or the third connecting section and the fourth connecting section are further provided with a fourth auxiliary fixing portion for fixing the spirit bubble.

Further, the second bracket is provided with an angle value scale.

And/or a side of the fifth connecting section corresponding to the second recess portion is provided with a plurality of tooth portions.

And/or a side of the sixth connecting section corresponding to the second recess portion is provided with a plurality of tooth portions.

And/or one or two sides of the second connecting portion are provided with raised ribs, and the raised ribs match the tooth portions.

And/or a front side of the second connecting portion is provided with an indicating portion for indicating an angle between the first bracket and the base.

Further, a rear side of the fifth connecting section is provided with a fifth step portion. A rear side of the sixth connecting section is provided with a sixth step portion.

The first end of the third connecting section and one side of the second connecting portion form a third bump. The first end of the fourth connecting section and the other side of the second connecting portion form a fourth bump.

The third bump moves along the fifth step portion. The fourth bump moves along the sixth step portion.

The indicating portion includes sharp indicating heads located at two ends of the indicating portion. The two sharp indicating heads respectively correspond to one raised rib. A horizontal indicating slot is provided between the two sharp indicating heads.

The two sharp indicating heads, the third bump and the fourth bump respectively form two dents. The two raised ribs are located in the corresponding dents.

Further, the second end of the first connecting section is provided with a first shaft hole, and the second end of the second connecting section is provided with a second shaft hole. The first end of the first connecting section is provided with a third shaft hole, and the first end of the second connecting section is provided with a fourth shaft hole.

The second end of the third connecting section is provided with a first shaft. The second end of the fourth connecting section is provided with a second shaft. The first shaft matches the first shaft hole. The second shaft matches the second shaft hole.

An outer side of the first end of the fifth connecting section is provided with a third shaft. An outer side of the first end of the sixth connecting section is provided with a fourth shaft. The third shaft matches the third shaft hole. The fourth shaft matches the fourth shaft hole.

An outer end of the third shaft is provided with a third rectangular block. An outer end of the fourth shaft is provided with a fourth rectangular block. The first end of the first connecting section is provided with a third rectangular hole. The third shaft hole is located at the middle of the third rectangular hole. The first end of the second connecting section is provided with a fourth rectangular hole. The fourth shaft hole is located at the middle of the fourth rectangular hole. The third rectangular block is interlocked with the third rectangular hole in a staggered manner based on the third shaft. The fourth rectangular block is interlocked with the fourth rectangular hole in a staggered manner based on the fourth shaft.

Further, a front side of the fifth connecting section is provided with the angle value scale for displaying the angle between the first bracket and the base. A front side of the sixth connecting section is provided with a plurality of first bumps. A first groove is formed between the adjacent first bumps. The first grooves correspond to angle values of different angles between the first bracket and the base.

A rear side of the first end of the fifth connecting section and a rear side of the first end of the sixth connecting section are connected via a third connecting portion.

One or two sides of the fourth connecting portion are provided with a second groove. An inner side of the second end of the first connecting section and/or an inner side of the second end of the second connecting section are provided with a second protrusion portion. The second protrusion portion matches the second groove to achieve a detachable connection between the fourth connecting portion and the base.

Further, a side of the first connecting portion facing the first bracket is provided with a first recess. A side of the fourth connecting portion facing the base is provided with a fourth recess. The first recess is in positional correspondence to the fourth recess.

And/or the first connecting section and the second connecting section are disposed in parallel, and/or the third connecting section and the fourth connecting section are disposed in parallel, and/or the fifth connecting section and the sixth connecting section are disposed in parallel.

And/or the fifth step portion has an arc shape, and the third bump moves in an arc shape along the fifth step portion.

And/or the sixth step portion has an arc shape, and the fourth bump moves in an arc shape along the sixth step portion.

And/or an outermost side of the first connecting section is provided with two first highest points, a straight line formed by a line connecting the two first highest points is parallel to the spirit bubble, and the height of an outer end of the third rectangular block does not exceed the height of the first highest points.

And/or an outermost side of the second connecting section is provided with two second highest points, a straight line formed by a line connecting the two second highest points is parallel to the spirit bubble, and the height of an outer end of the fourth rectangular block does not exceed the height of the second highest points.

And/or the bottom of the base is in a plane parallel to the spirit bubble.

And/or the second end of the first connecting section and the second end of the second connecting section are both provided with an extension section extending outwards and an extension portion formed by the intersection of the two extension sections. A hanging hole is formed between the extension portion and the first connecting portion. An outer side surface of the extension portion has a linear or planar shape. The outer side surface of the extension portion is in a vertical state with the spirit bubble. A straight line formed by a line connecting the first end of the first connecting section and the first end of the second connecting section is parallel to the spirit bubble.

Or the second bracket has a circular arc shape.

Further, the base is provided with a magnet, or the base is provided with a clamp for fixing the base on the knife body, or the base is provided with a suction cup for fixing the base on the knife body, or the base is provided with an adhesive portion for fixing the base on the knife body, and/or the base is further provided with the hanging hole.

Or the length, height and width of the device for observing and positioning a sharpening angle of a cutting edge do not exceed 8 cm.

In view of the foregoing technical features, the present invention has the following advantageous effects:

According to the device for observing and positioning a sharpening angle of a cutting edge in the present invention, a base is placed on a knife body (a blade face or a blade edge), a knife is placed on a sharpening stone according to a correct sharpening angle range, and then an angle between a spirit bubble and the base is adjusted, whereby the spirit bubble is in a horizontal state. In this way, in a dynamic process of grinding a cutting edge of the knife, as long as a grinder or an operator observes a position condition of a level bubble of the spirit bubble (namely, a change of a positional relationship between the level bubble and an indicating line) and corrects an inclination angle of the knife in real time to ensure that the spirit bubble is in the horizontal state, it is ensured that a sharpening angle of the cutting edge of the knife is continuously kept in the correct sharpening angle range, and the edge is ground in accordance with a correct sharpening angle or sharpening angle of the knife (or the spirit bubble continuously displays and assists the knife in correcting a correct sharpening angle of an edge portion of a specific knife in real time). The edge sharpening effect is good, and the cutting edge can be sharpened more accurately.

The device for observing and positioning a sharpening angle of a cutting edge in the present invention may be applied to various knives (namely, knives with different widths of blade faces or knives with curved cutting edges or knives with different sharpening angles). As long as the base corresponds to a cutting edge portion to be sharpened, the effect of continuously displaying, by the spirit bubble, the correct sharpening angle of the edge portion of the knife and assisting in correcting the correct sharpening angle of the edge portion of the knife in real time during the sharpening of the cutting edge in a certain interval can be achieved.

According to the device for observing and positioning a sharpening angle of a cutting edge in the present invention, the magnitude of a first included angle between a first bracket and the base is adjusted via the base, the first bracket and a second bracket (an angle value of the first included angle may be represented by an angle value scale on the second bracket). Then the base is placed on the blade face, and the knife is synchronously rotated with the base until it is measured by the spirit bubble on the first bracket that the first bracket is in a horizontal state (the level bubble is located at a middle part of a tube body). At this moment, the sharpening angle between the knife and the horizontally placed sharpening stone is equal to the magnitude of the first included angle. During the sharpening of the cutting edge, the operator may correct the sharpening angle of the knife at any time by observing the position of the level bubble, whereby the correct sharpening angle of the knife is kept, that is, edge sharpening is kept at a specific sharpening angle of the knife, thereby avoiding the offset of the sharpening angle.

According to the device for observing and positioning a sharpening angle of a cutting edge in the present invention, it is only necessary to place or fix the base on the blade face (the base and a cutting edge to be sharpened are located on different blade faces). There is no interference between the knife and the sharpening stone, and the sharpening stone is not damaged. Even if the blade face of the knife has a small flat surface, the device for observing and positioning a sharpening angle of a cutting edge in the present invention also effectively keeps the sharpening angle of the cutting edge unchanged. That is to say, the width change of the blade face does not affect the function of effectively keeping the sharpening angle of the cutting edge unchanged using the device for observing and positioning a sharpening angle of a cutting edge. The device for observing and positioning a sharpening angle of a cutting edge is applicable to knives with any blade face width, and has a wider scope of application.

Figure 1:
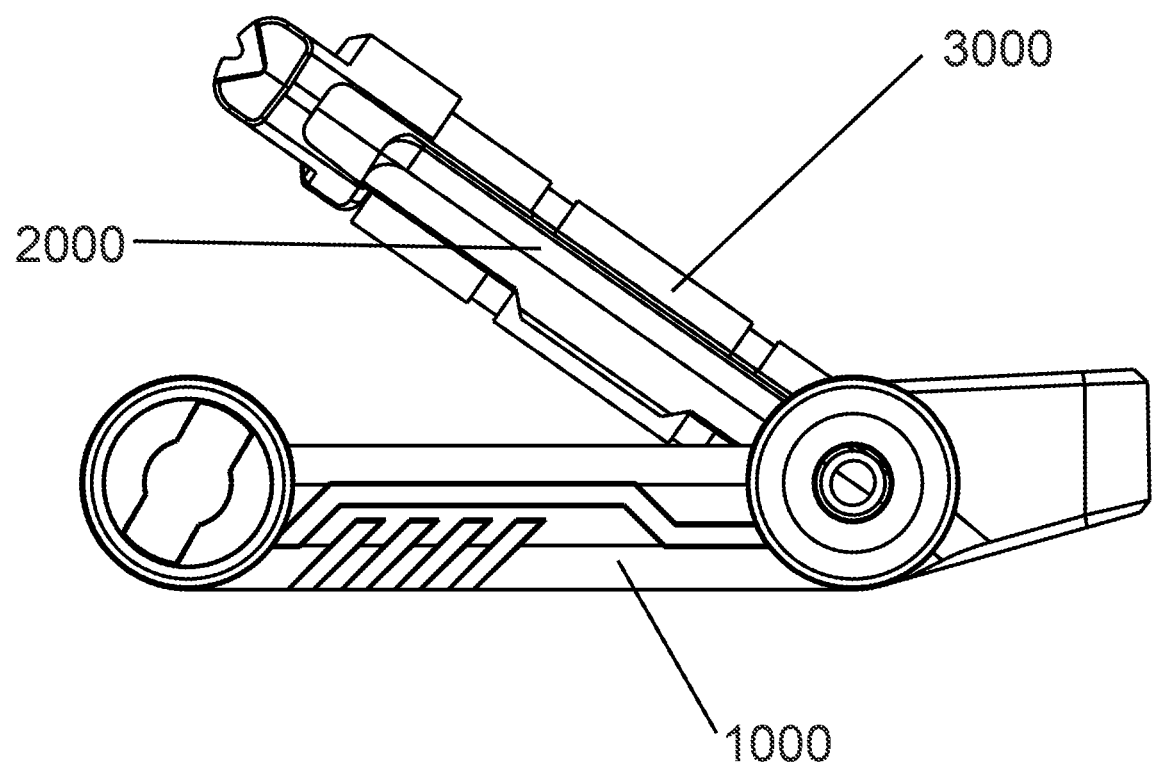
FIG. 1 schematically shows a structural view of a device for observing and positioning a sharpening angle of a cutting edge in Embodiment 1 (unfolded state, from the perspective of a left view).
Figure 2:
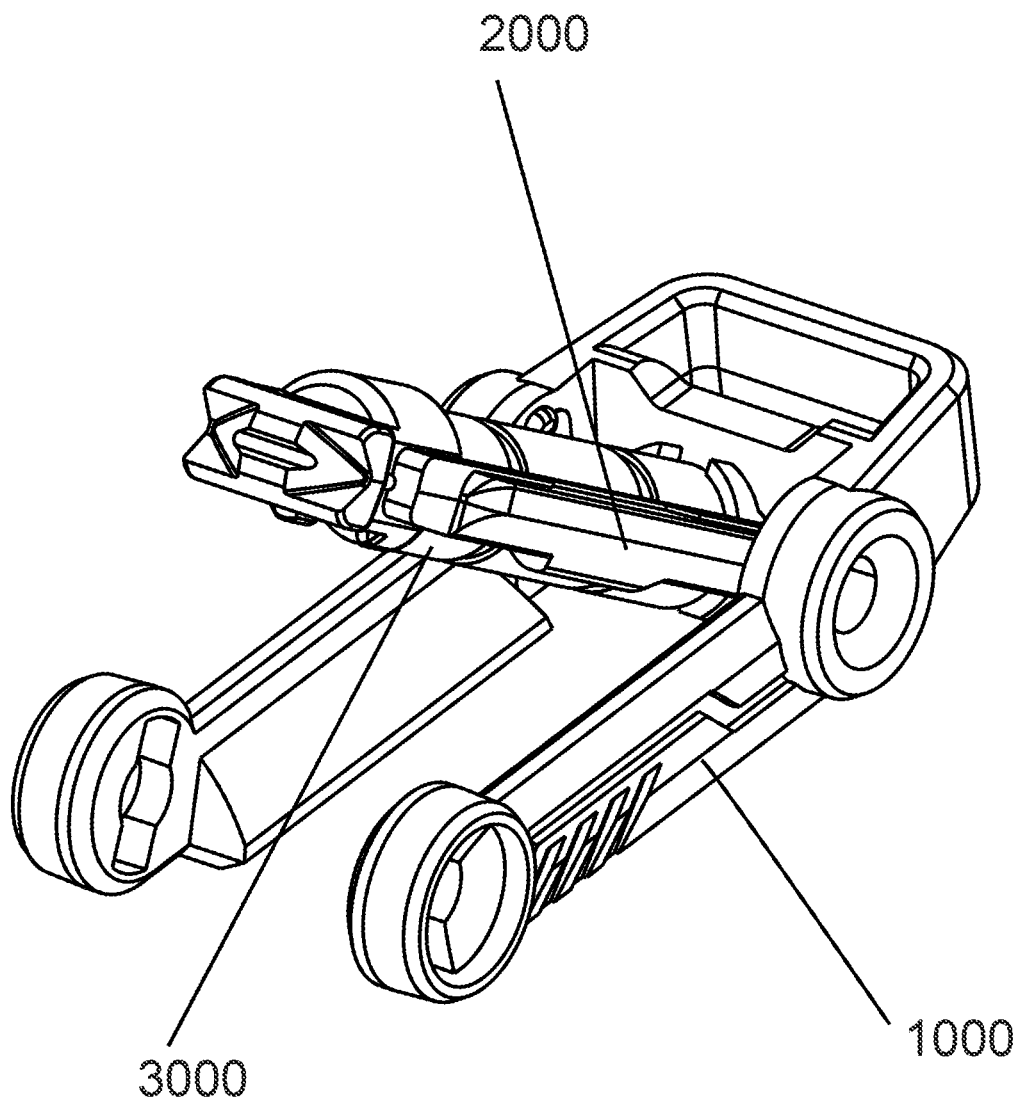
FIG. 2 schematically shows a structural view of a device for observing and positioning a sharpening angle of a cutting edge in Embodiment 1 (unfolded state, from the perspective of a perspective view).
Figure 3:
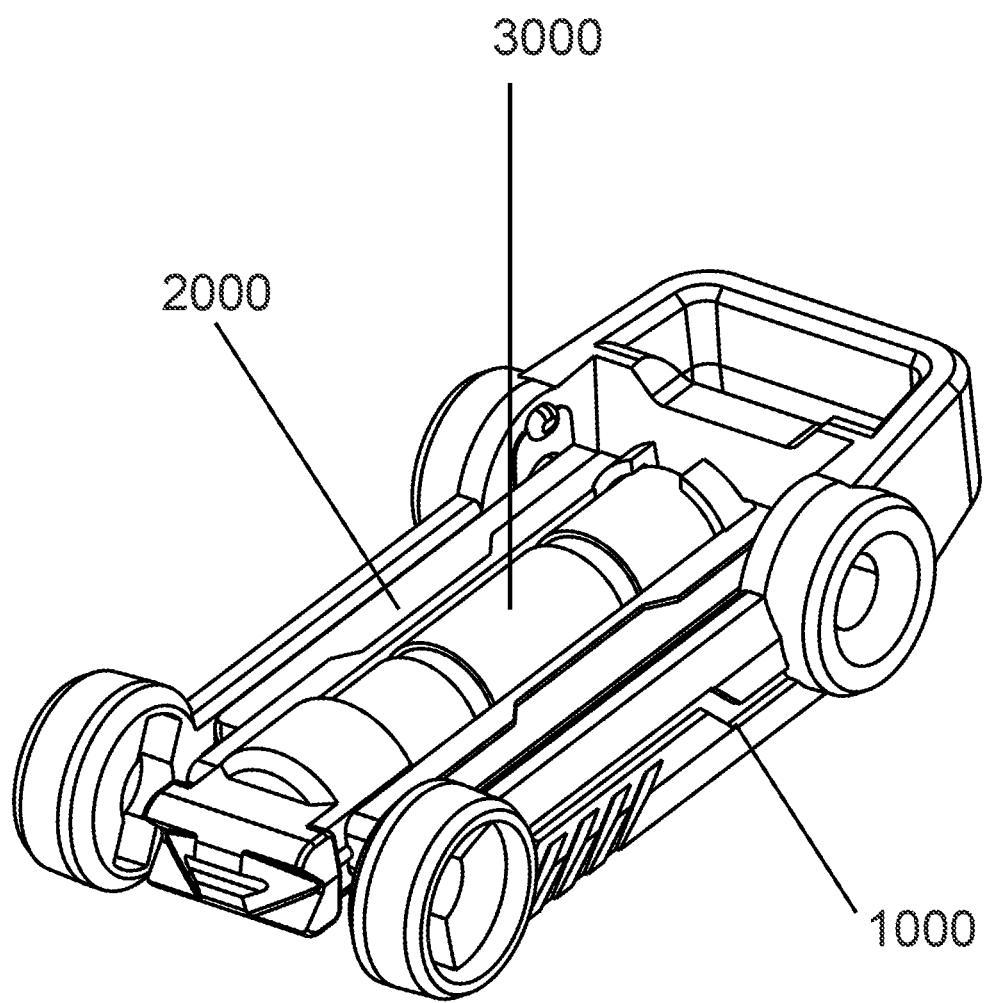
FIG. 3 schematically shows a structural view of a device for observing and positioning a sharpening angle of a cutting edge in Embodiment 1 (folded state, from the perspective of a stereogram).

In the figures: 1, 1000, base; 1001, first included angle; 1002, second included angle; 1003, magnet; 1004, third recess portion; 1100, first connecting section; 1101, first end of first connecting section; 1102, second end of first connecting section; 1103, first shaft hole; 1104, third shaft hole; 1105, third rectangular hole; 1106, first highest point; 1200, second connecting section; 1201, first end of second connecting section; 1202, second end of second connecting section; 1203, second shaft hole; 1204, fourth shaft hole; 1205, fourth rectangular hole; 1206, second highest point; 1300, first connecting portion; 1301, first recess; 1400, extension portion; 1401, hanging hole; 1500, second protrusion portion; 2000, first bracket; 2001, first recess portion; 2100, third connecting section; 2101, first end of third connecting section; 2102, second end of third connecting section; 2103, first shaft; 2104, first auxiliary fixing portion; 2105, third bump; 2200, fourth connecting section; 2201, first end of fourth connecting section; 2202, second end of fourth connecting section; 2203, second shaft; 2204, second auxiliary fixing portion; 2205, fourth bump; 2300, second connecting portion; 2301, raised rib; 2400, third auxiliary fixing portion; 2500, fourth auxiliary fixing portion; 2600, indicating portion; 2601, sharp indicating head; 2602, indicating slot; 2700, dent; 3000, spirit bubble; 3100, tube body; 3101, indicating line; 3102, level bubble; 4000, second bracket; 4001, second recess portion; 4002, tooth portion; 4100, fifth connecting section; 4101, first end of fifth connecting section; 4102, second end of fifth connecting section; 4103, third shaft; 4104, third rectangular block; 4105, fifth step portion; 4200, sixth connecting section; 4201, first end of sixth connecting section; 4202, second end of sixth connecting section; 4203, fourth shaft; 4204, fourth rectangular block; 4205, sixth step portion; 4300, angle value scale; 4301, angle scale value; 4302, first bump; 4303, first groove; 4400, third connecting portion; 4500, fourth connecting portion; 4501, second groove; 4502, fourth recess; 5000, knife; 5001, cutting edge; 5002, blade face; 5003, angle required for knife sharpening; 5004, blade edge line; 5005, blade edge; 5006, edge line; 5007, cutting edge plane; 5008, edge; 5009, spine blade; 5010, belly; 5011, point; 5012, spine; 6000, sharpening stone.

DETAILED DESCRIPTION OF THE DISCLOSURE

The present invention will be further described below with reference to specific implementations. It should be understood that these embodiments are illustrative only and are not intended to limit the scope of the present invention. It should be further understood that those skilled in the art, upon reading the teachings of the present invention, may make various changes or modifications to the present invention, and that such equivalents are intended to fall within the scope of the appended claims of the present application.

Referring to FIGS. 1 to 4, a specific embodiment 1 is shown. Embodiment 1 provides a device for observing and positioning a sharpening angle of a cutting edge. The device includes a spirit bubble 3000 for observing a change of a sharpening angle of a cutting edge and positioning the sharpening angle of the cutting edge, and a base 1000 for fixing the device on a knife body.

The spirit bubble 3000 is rotatably connected to the base 1000. For example, the spirit bubble 3000 may be in shaft connection with the base 1000 and rotated to each other via a shaft for adjusting an angle between the spirit bubble 3000 and the base 1000. The spirit bubble 3000 may be directly connected (for example, the spirit bubble 3000 is provided with a shaft, which matches a shaft hole on the base 1000) or indirectly connected to the base 1000 (for example, the spirit bubble 3000 is rotatably connected to the base 1000 by means of a first bracket 2000, referring to FIGS. 1 to 3). In addition, tightness of the shaft connection between the spirit bubble 3000 and the base 1000 may be adjusted. The tightness herein is determined by friction between an assembly shaft and a shaft sleeve between the spirit bubble 3000 and the base 1000. By increasing the friction between the assembly shaft and the shaft sleeve between the spirit bubble 3000 and the base 1000, the purpose of not only rotatably adjusting the angle between the spirit bubble 3000 and the base 1000, but also keeping the angle unchanged is achieved. That is, when an operator rotates the spirit bubble 3000 and the base 1000 with force to adjust a relative position therebetween, the angle between the spirit bubble 3000 and the base 1000 may be changed. When the operator releases the spirit bubble 3000 and the base 1000, the angle between the spirit bubble 3000 and the base 1000 adjusted under the action of the friction keeps unchanged, so as to avoid affecting the accuracy of a sharpening angle of a cutting edge caused by the change of the angle between the spirit bubble 3000 and the base 1000 during the grinding of the cutting edge. It is also not necessary to fix the angle between the spirit bubble 3000 and the base 1000 additionally in a manual manner or by means of other tools.

The knife body includes a blade face 5002 and a blade edge 5005, or parts of the knife 5000 that may be used to place or fix or connect the base 1000, so as to adjust the sharpening angle of the cutting edge by using the angle between the base 1000 and the spirit bubble 3000. The sharpening angle of the cutting edge refers to an angle between a center line of the knife body and a sharpening stone when sharpening a cutting edge plane 5007 or the blade edge 5005.

The cutting edge includes the cutting edge plane 5007 and the blade edge 5005. For example, in the first case, when a sharpening angle of the cutting edge is based on the center line of the knife body in a vertical state being 0 degrees, an included angle between the cutting edge and the center line of the knife body in a parallel state is an angle required for grinding the cutting edge, which is equal to the sharpening angle of the cutting edge. The base 1000 is parallel to the center line of the knife body (for example, most of the blade faces are parallel to the center line of the knife body). The base 1000 is fixed on the blade face 5002 of the knife body. The cutting edge plane 5007 or the blade edge 5005 is adjacent to the sharpening stone. Then the spirit bubble 3000 is adjusted to a horizontal state (rotating between the spirit bubble 3000 and the base 1000). In this case, the angle between the spirit bubble 3000 and the base 1000 is equal to the degree of the sharpening angle of the cutting edge. At this moment, as long as the spirit bubble 3000 is in a horizontal state, it can be ensured that the knife keeps grinding at the sharpening angle of the cutting edge. That is to say, the operator adjusts the sharpening angle of the cutting edge between the cutting edge and the sharpening stone by observing whether the spirit bubble 3000 is horizontal (whether a level bubble 3102 is between two indicating lines 3101), and assists in making the spirit bubble 3000 horizontal, thereby also positioning the sharpening angle of the cutting edge of the knife.

For example, in the second case, the blade face 5002 of the knife body is a plane which is not parallel to the center line of the knife body. When the base 1000 is fixed with the blade face 5002, or when the base 1000 is fixed with the blade edge 5005, the base 1000 is not parallel to the center line of the knife body. The base 1000 is fixed on the blade face 5002 of the knife body, the cutting edge plane 5007 or the blade edge 5005 is parallel to a grinding face of a sharpening stone 6000, and the spirit bubble 3000 is adjusted to a horizontal state (rotating between the spirit bubble 3000 and the base 1000). In this case, although the angle between the spirit bubble 3000 and the base 1000 is less than the degree of the sharpening angle of the cutting edge, an angle value between the spirit bubble 3000 and the base 1000 is a supplementary value of an angle required for grinding the currently ground cutting edge plane 5007. At this moment, as long as the spirit bubble 3000 is in a horizontal state, it can be ensured that the knife keeps grinding at the sharpening angle of the cutting edge and that the cutting edge has a good grinding effect.

The spirit bubble 3000 is rotatably connected to the base 1000, which means that an end portion of the spirit bubble 3000 is rotatably connected to the base 1000, or the spirit bubble 3000 is rotatably connected to an end portion of the base 1000, or an end portion of the spirit bubble 3000 is rotatably connected to an end portion of the base 1000.

Figure 4:
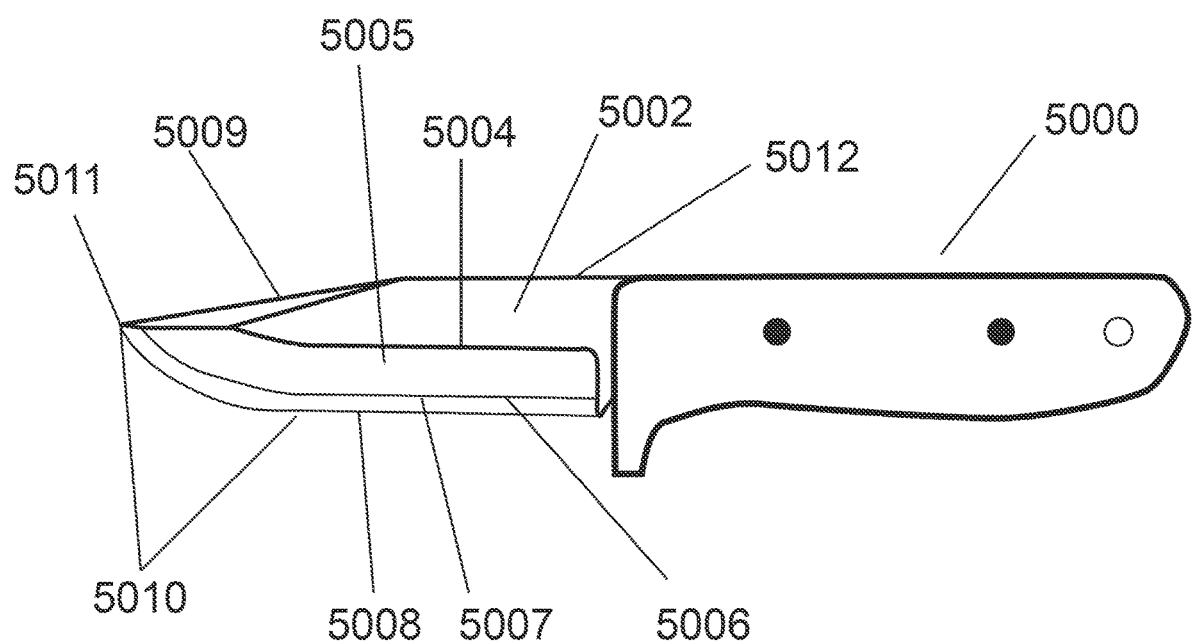
FIG. 4 schematically shows a structural view of a knife in Embodiment 1.
Figure 5:
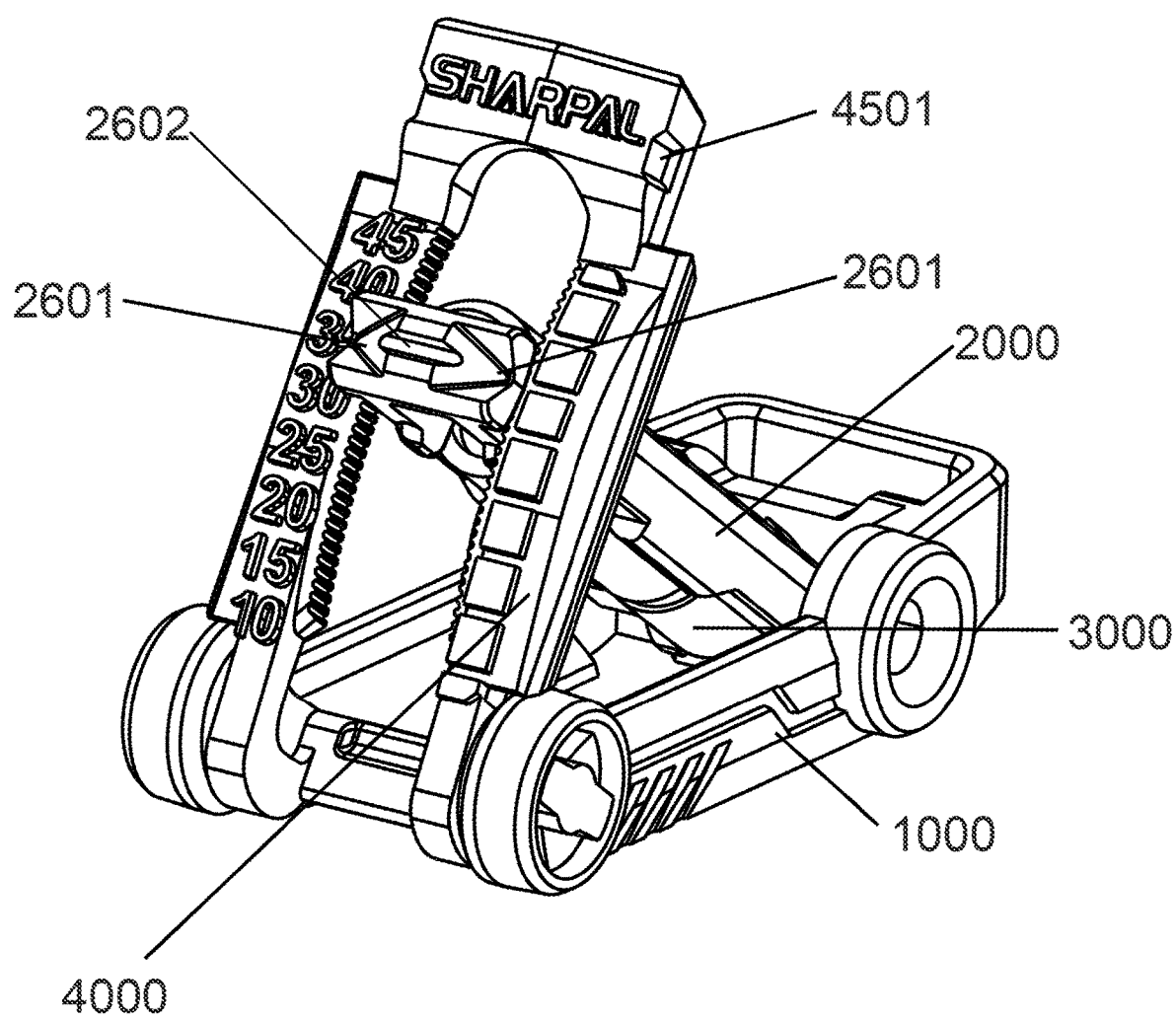
FIG. 5 shows a stereogram 1 of a device for observing and positioning a sharpening angle of a cutting edge in Embodiment 2 (unfolded state).
Figure 6:
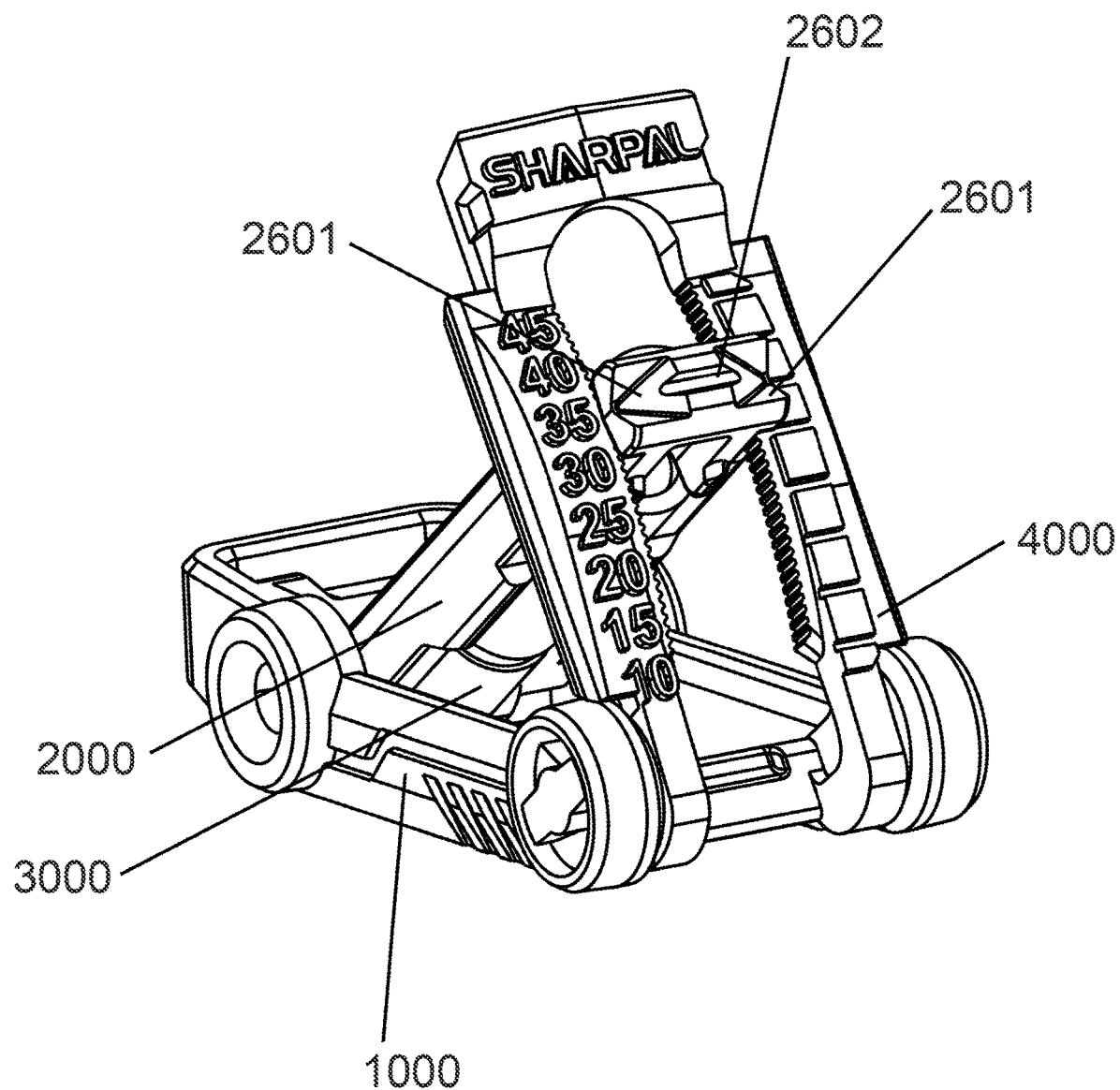
FIG. 6 shows a stereogram 2 of a device for observing and positioning a sharpening angle of a cutting edge in Embodiment 2 (unfolded state).
Figure 7:
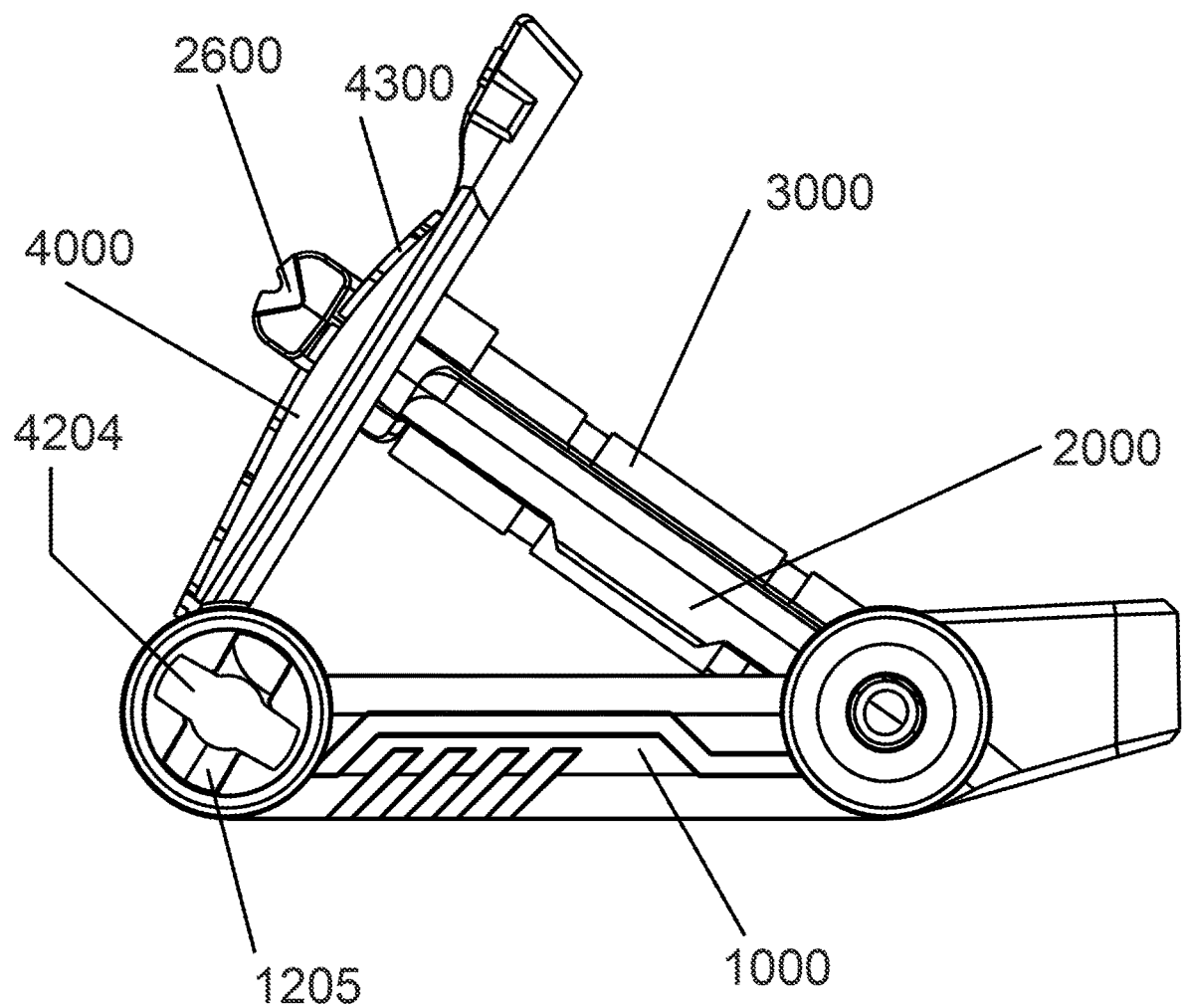
FIG. 7 shows a right view of a device for observing and positioning a sharpening angle of a cutting edge in Embodiment 2 (unfolded state).
Figure 8:
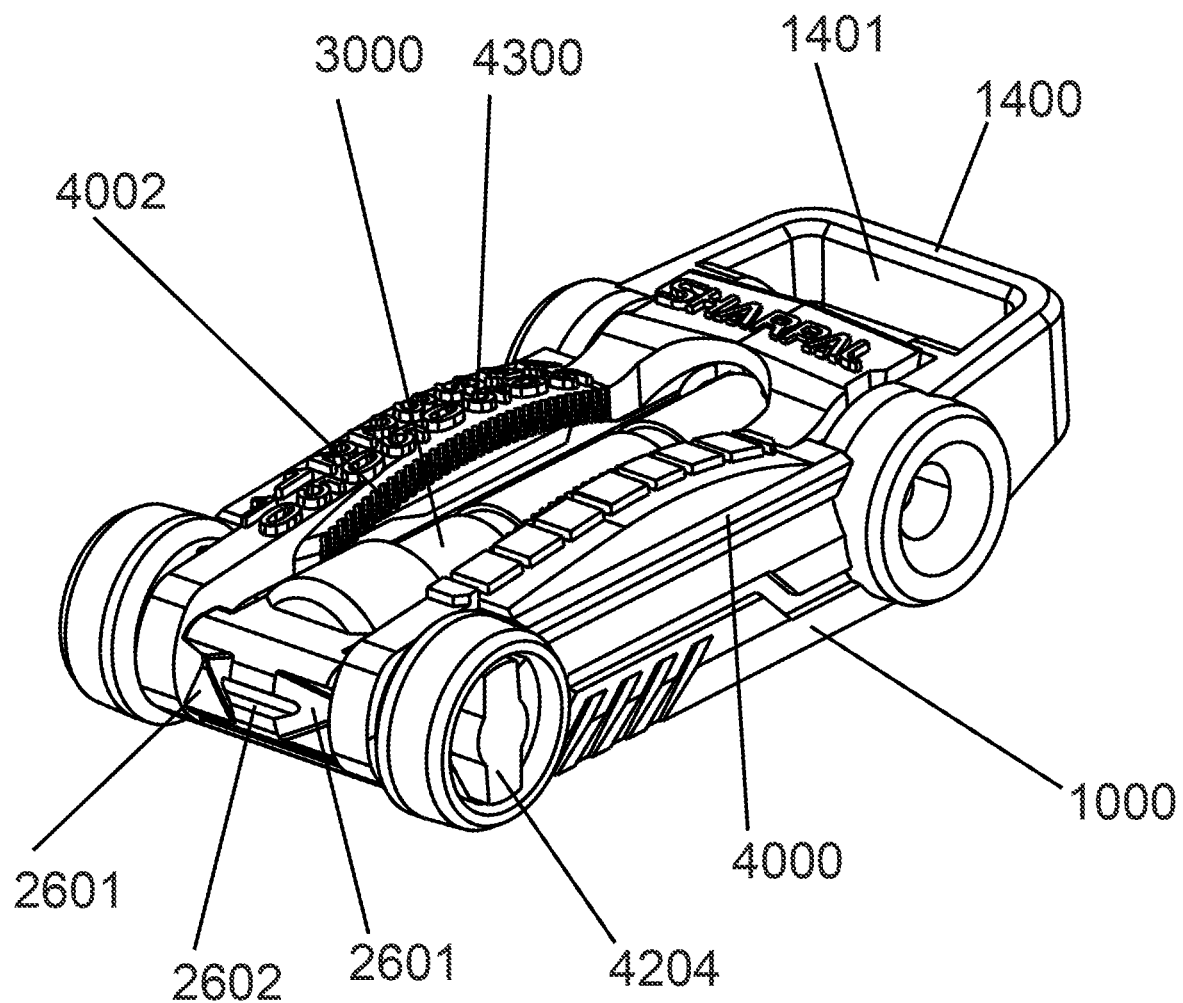
FIG. 8 shows a stereogram 2 of a device for observing and positioning a sharpening angle of a cutting edge in Embodiment 3 (folded state).
Figure 9:
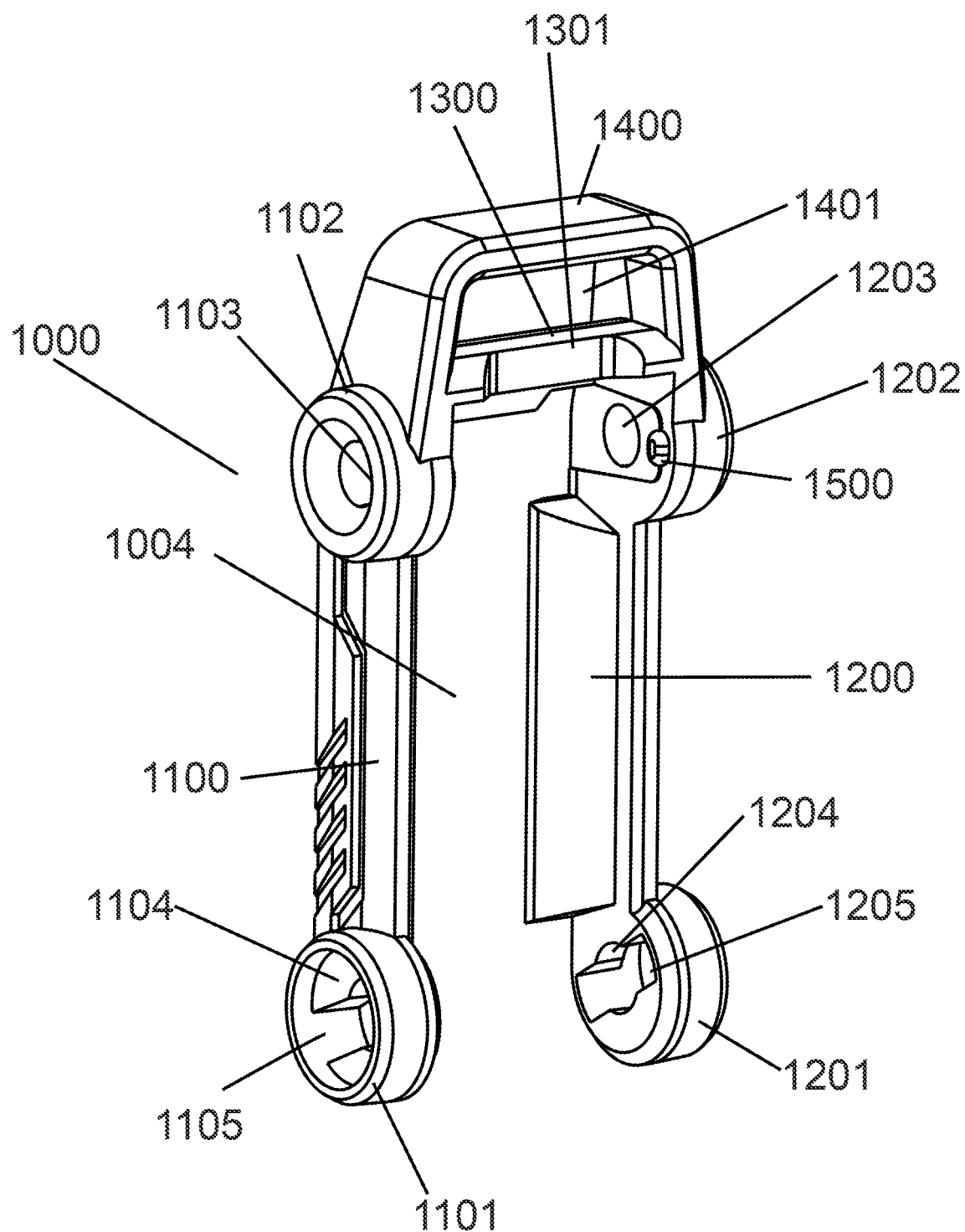
FIG. 9 schematically shows a structural view of a base in Embodiment 2.
Figure 10:
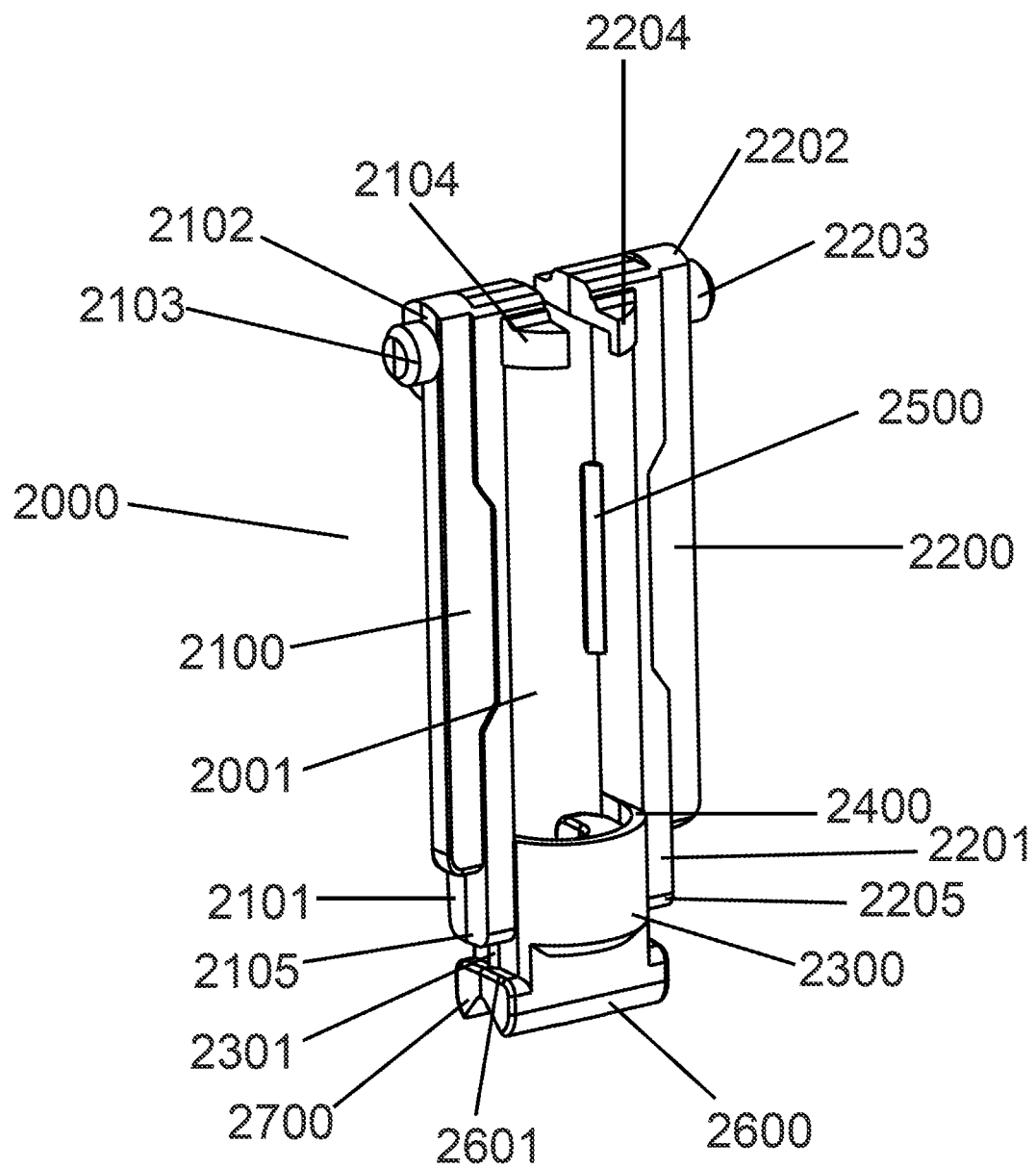
FIG. 10 schematically shows a structural view of a first bracket in Embodiment 2.
Figure 11:
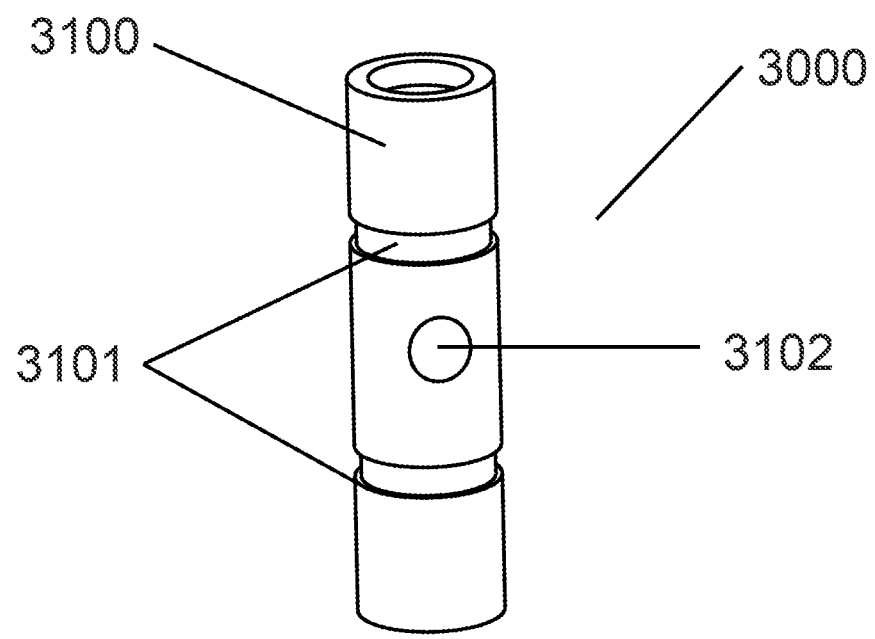
FIG. 11 schematically shows a structural view of a spirit bubble in Embodiment 2.
Figure 12:
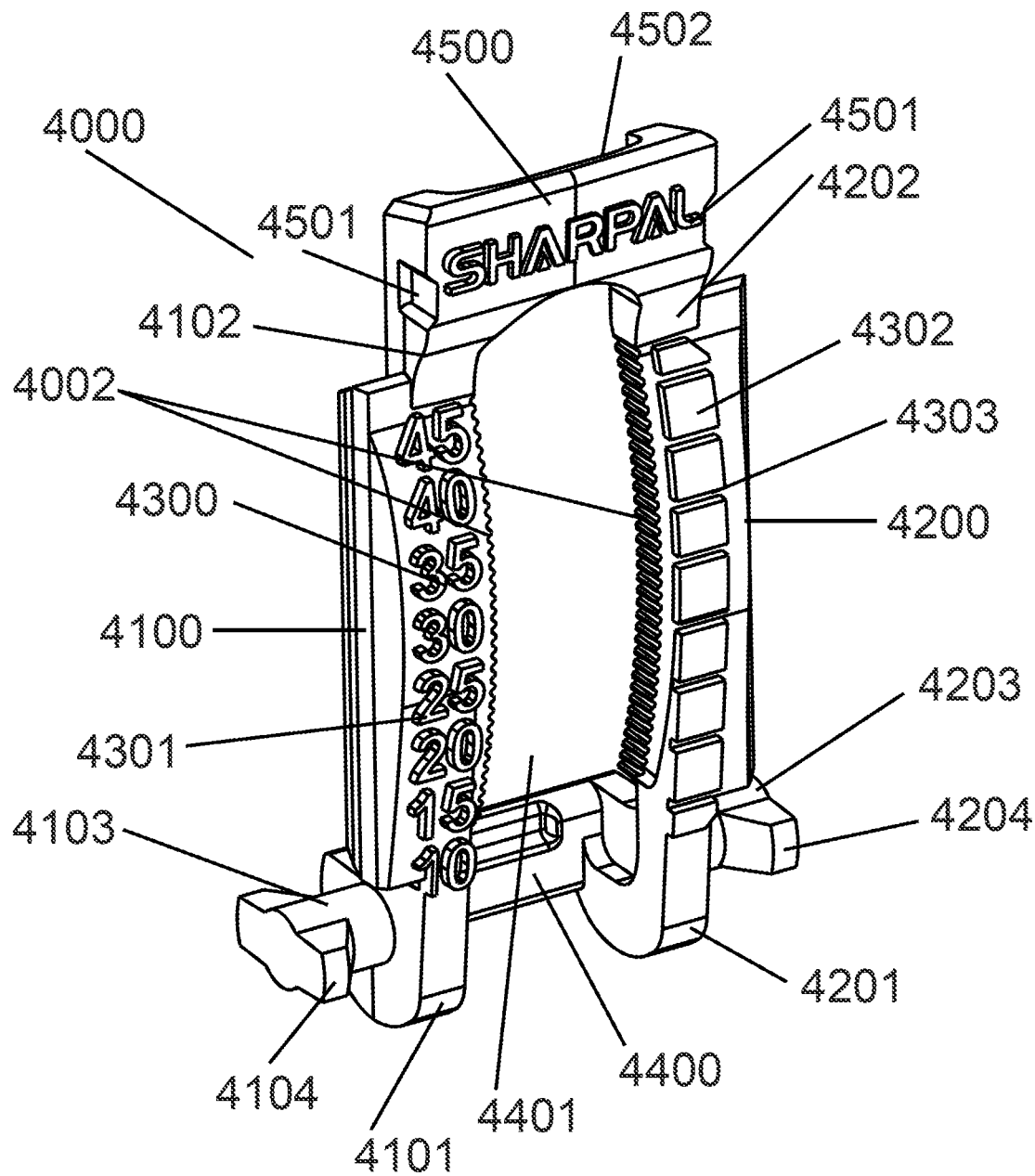
FIG. 12 schematically shows a structural view of a second bracket in Embodiment 2.
Figure 13:
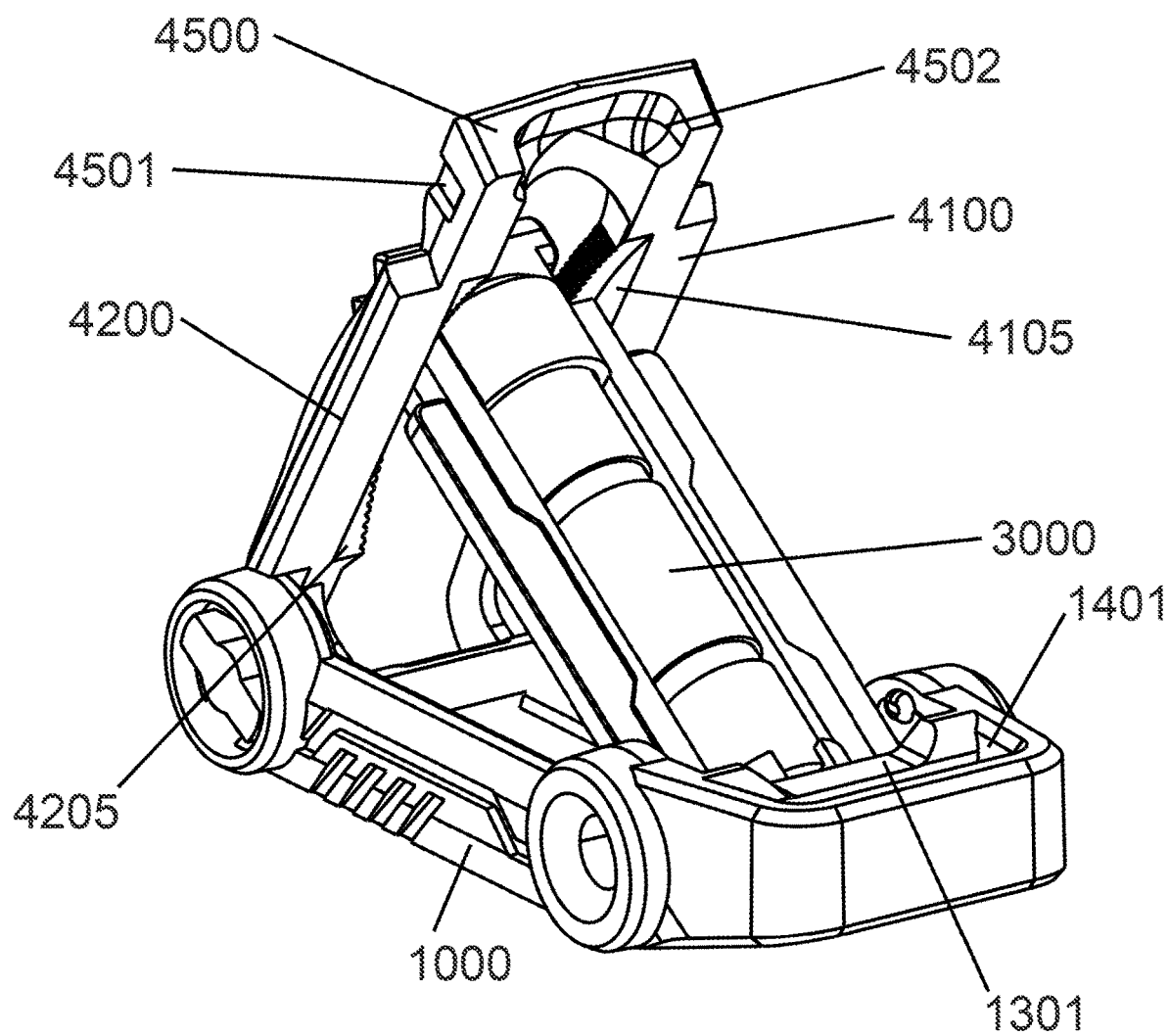
FIG. 13 shows a stereogram 2 of a device for observing and positioning a sharpening angle of a cutting edge in Embodiment 4 (unfolded state).
Figure 14:
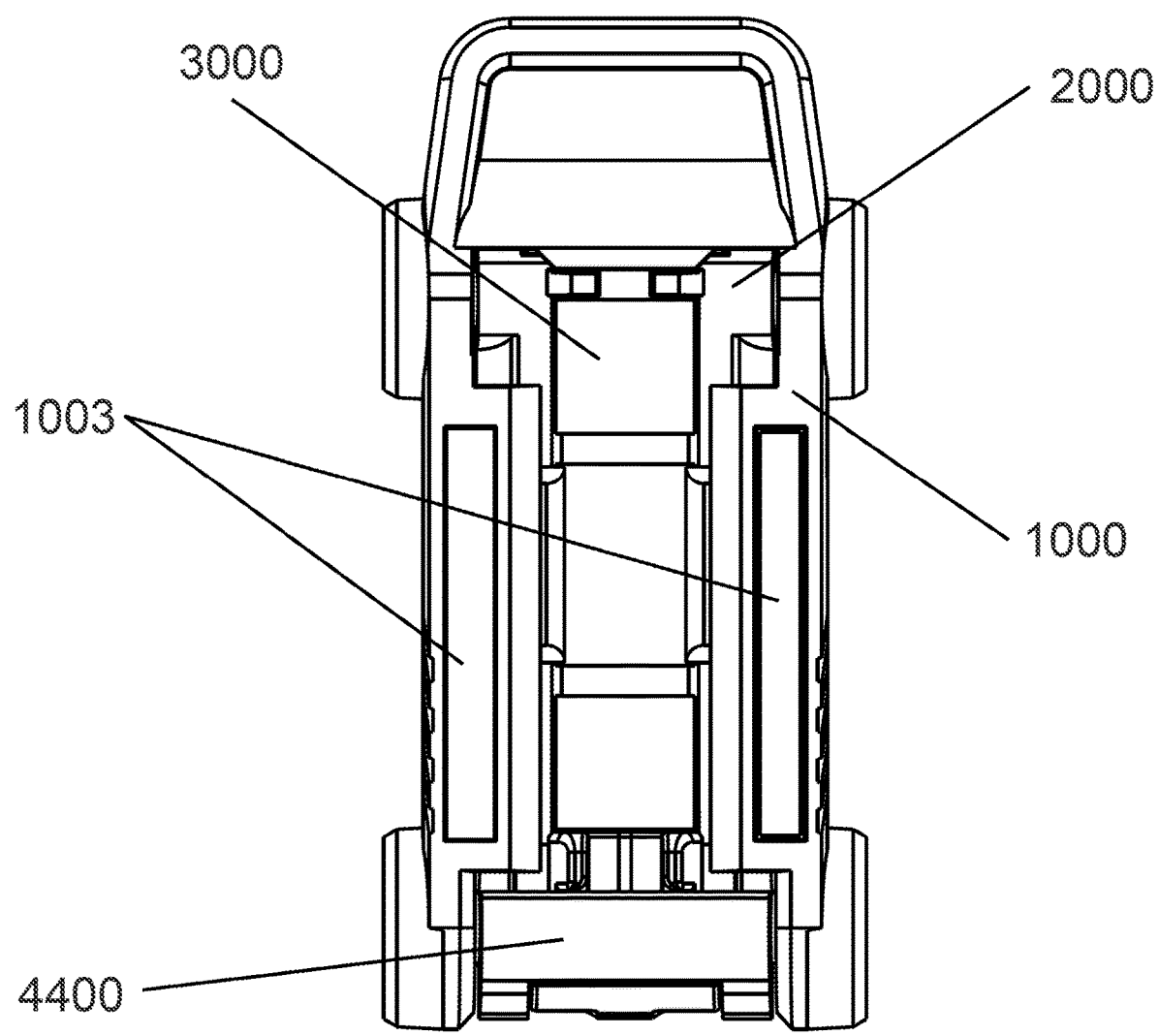
FIG. 14 shows a bottom view of a device for observing and positioning a sharpening angle of a cutting edge in Embodiment 2 (folded state).
Figure 15:
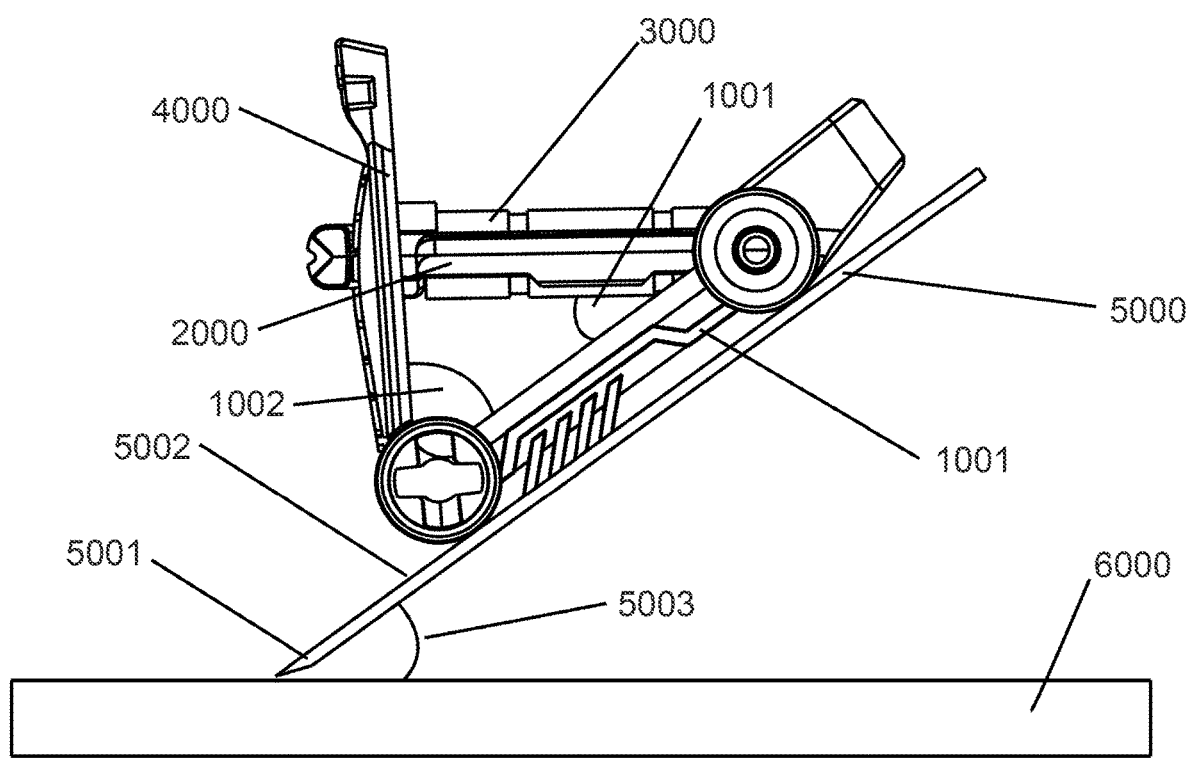
FIG. 15 shows a use state diagram of a device for observing and positioning a sharpening angle of a cutting edge in Embodiment 2.

For example, in the third case, when the cutting edge is in a bending shape (namely, corresponding to the cutting edge plane 5007 or the blade edge 5005 at a part of a belly 5010) or when it is necessary to sharpen a spine blade 5009 (if the spine blade is not sharpened, the knife herein is a false edge or a spine), for example, with reference to a knife structure shown in FIG. 4, the operator may adjust the position of the base 1000 on the knife body, whereby the base 1000 corresponds to the cutting edge of a part to be ground. For example, the cutting edge of the part to be ground is aligned with a first end of the base 1000 (for example, a first end 1101 of the first connecting section and a first end 1201 of the second connecting section further correspond to cutting edge parts of the part to be ground). The principle and effect thereof are substantially the same as those in the first case and/or the second case described above, and the description thereof will not be repeated. Also, cutting edge parts at different bending degrees can be ground at a correct angle, thereby further expanding the scope of application of the device.

Referring to FIGS. 5 to 15, a specific embodiment 2 is shown. Embodiment 2 provides a device for observing and positioning a sharpening angle of a cutting edge. The device for observing and positioning a sharpening angle of a cutting edge includes a base 1000, and a first bracket 2000 and a second bracket 4000 for fixing a spirit bubble 3000. A first end of the base 1000 is rotatably connected (for example, axially rotatably connected) to a first end of the second bracket 4000. That is to say, when the base 1000 is fixed, the second bracket 4000 may be rotated or turned over using a connection joint between the first end of the base 1000 and the first end of the second bracket 4000 as a fulcrum, and the magnitude of a second included angle 1002 between the base 1000 and the second bracket 4000 is adjusted. A second end of the base 1000 is rotatably connected (for example, axially rotatably connected) to a second end of the first bracket 2000. That is to say, when the base 1000 is fixed, the first bracket 2000 may be rotated or turned over using a connection joint between the second end of the base 1000 and the second end of the first bracket 2000 as a fulcrum, and the magnitude of a first included angle 1001 between the base 1000 and the first bracket 2000 is adjusted. The first end of the first bracket 2000 is movably connected to the second bracket 4000 for adjusting the magnitude of an included angle (for example, the magnitude of the first included angle 1001) between the first bracket 2000 and the base 1000.

Preferably, the second bracket 4000 has a scale.

The spirit bubble 3000 is configured to observe a change of a sharpening angle of a cutting edge and position the sharpening angle of the cutting edge. The base 1000 is configured to fix the device on a knife body. For example, the device is placed on or connected to the knife body (for example, a blade face or a blade edge of a knife).

At this moment, the base 1000, the first bracket 2000 and the second bracket 4000 form a triangle shape (for example, preferably an acute triangle shape with a stable structure), or the base 1000, the first bracket 2000 and the second bracket 4000 form a sector shape (for example, the second bracket 4000 has a circular arc shape). The first end of the first bracket 2000 is movably connected to the second bracket 4000. That is, the first end of the first bracket 2000 may be connected to any point on the second bracket 4000, or the first end of the first bracket 2000 may slide along the second bracket 4000 while keeping a connected state with the second bracket 4000 during the sliding.

Preferably, the base 1000 in Embodiment 2 is provided with a magnet 1003. The magnet 1003 may be attached to the bottom of the base 1000 or placed in the base 1000. The magnet 1003 attracts the knife whereby the base 1000 is fixed on the blade face, thereby assisting in fixing the device for observing and positioning a sharpening angle of a cutting edge on the blade face of the knife or at a specified position on the blade face of the knife. For example, an injection molding process is adopted. The magnet 1003 is added into the base 1000 during the production of the base 1000. For example, the magnet 1003 is placed into the base 1000. In this way, the bottom of the base 1000 is more stable and unlikely to fall off, thereby also effectively preventing the magnet 1003 from rusting.

As an alternative, the base 1000 is provided with a clamp for fixing the base 1000 on the blade face. For example, the end portion or the bottom of the base 1000 is provided with a U-shaped clamp. A spine 5012 is embedded in the U-shaped clamp, and the U-shaped clamp clamps the blade face on both sides of the knife, so as to fix the base 1000 on the blade face, thereby assisting in fixing the device for observing and positioning a sharpening angle of a cutting edge on the blade face of the knife or at a specified position on the blade face of the knife. Or, the base 1000 is provided with a suction cup, and the suction cup is absorbed on the surface of the knife body, so as to fix the base 1000 and the knife 5000. Or, the base 1000 (for example, preferably the bottom of the base 1000) is provided with an adhesive portion by which the base 1000 and the knife 5000 are fixed.

As an alternative, even in the absence of the magnet 1003 or the clamp, a user may press the base 1000 against the blade face, thereby fixing the base 1000 on the blade face, and assisting in fixing the device for observing and positioning a sharpening angle of a cutting edge on the blade face of the knife or at a specified position on the blade face of the knife.

The spirit bubble 3000 fixed on the first bracket 2000 includes a tube body 3100. The tube body 3100 is provided with two indicating lines 3101. The two indicating lines 3101 divide the tube body 3100 into three spaces of equal size. The tube body 3100 is provided with a swimming level bubble 3102. The level bubble 3102 refers to a swimming bubble in the tube body 3100. By observing a positional relationship between the bubble and the indicating lines 3101, it is determined whether an object plane measured by the spirit bubble 3000 or other planes are in a horizontal state or a vertical state or at a certain angle (for example, corresponding to an angle range 0-45° of the device). When the level bubble 3102 in the tube body 3100 is located in the middle space among the equally-sized spaces of the tube body 3100, it indicates that the first bracket 2000 is located in a horizontal state (for example, an offset angle between the first bracket 2000) and an actual horizontal line is within a range of ±0.5°, and the first bracket 2000 is considered to be located in a horizontal state. That is to say, the spirit bubble 3000 is considered to be located in a horizontal state. Certainly, the offset angle range between the first bracket 2000 and the actual horizontal line may also be adjusted according to actual situations. As long as cutting edge grinding is continuously kept in a correct sharpening angle range when a grinder holds a knife to make a cutting edge grinding action, an edge is ground in accordance with a correct sharpening angle of the knife at this moment. Then the first bracket 2000 within the offset angle range between the first bracket 2000 and the actual horizontal line is also considered to be in a horizontal state correspondingly, namely, the spirit bubble 3000 is considered to be in a horizontal state. When the level bubble 3102 in the tube body 3100 is located in the two end spaces among the equally-sized spaces of the tube body 3100, it indicates that the first bracket 2000 deviates from the horizontal state.

Preferably, the base 1000 includes a first connecting section 1100 and a second connecting section 1200. The first connecting section 1100 and the second connecting section 1200 are disposed in parallel, and corresponding end portions of the two connecting sections are connected via a first connecting portion 1300. That is to say, a second end 1102 of the first connecting section and a second end of the second connecting section are connected via the first connecting portion 1300 to form a recess shape, namely, a third recess portion 1004. When the first bracket 2000 and the spirit bubble 3000 fixed thereby are folded (namely, after the first bracket 2000 reverses towards the base 1000, the first bracket 2000 is embedded in the base 1000), the third recess portion 1004 is configured to receive the first bracket 2000 and the spirit bubble 3000 fixed thereby. The tube body 3100 of the spirit bubble 3000 and the first bracket 2000 are parallel to each other, and are in consistent angle states.

Preferably, the base 1000 is further provided with a hanging hole 1401. The hanging hole 1401 may be configured to thread a hanging rope, or the device for observing and positioning a sharpening angle of a cutting edge is hung on a specified object (for example, a key ring) through the hanging hole 1401, whereby the device for observing and positioning a sharpening angle of a cutting edge may be carried with an operator, and is not easy to be lost, and the operator may use the device conveniently anytime and anywhere.

At this moment, the length, height and width of the device for observing and positioning a sharpening angle of a cutting edge do not exceed 8 cm. The size, specification or volume of the device for observing and positioning a sharpening angle of a cutting edge is small, whereby the device is convenient to carry with the operator and use anytime.

Preferably, the first bracket 2000 includes a third connecting section 2100 and a fourth connecting section 2200. The third connecting section 2100 and the fourth connecting section 2200 are disposed in parallel. A first end 2101 of the third connecting section is connected to a first end 2201 of the fourth connecting section via a second connecting portion 2300, so as to form a first recess portion 2001 for placing the spirit bubble 3000.

The second end 2102 of the third connecting section is provided with a first auxiliary fixing portion 2104 for fixing the spirit bubble 3000, for example, a first step portion for fixing an end portion of one end of the tube body 3100 of the spirit bubble 3000 (for example, a second end of the tube body 3100 of the spirit bubble 3000). The second end 2202 of the fourth connecting section is provided with a second auxiliary fixing portion 2204 for fixing the spirit bubble 3000, for example, a second step portion for fixing an end portion of one end of the tube body 3100 of the spirit bubble 3000. The first step portion and the second step portion assist in fixing the end portion of the same end of the tube body 3100 of the spirit bubble 3000 at the same time.

A third auxiliary fixing portion 2400 for fixing the spirit bubble 3000 is disposed between the first end 2101 of the third connecting section and the first end 2201 of the fourth connecting section, for example, a third step portion for fixing an end portion of the other end of the tube body 3100 of the spirit bubble 3000 (for example, a first end of the tube body 3100 of the spirit bubble 3000). The third step portion has an arc shape. The first step portion, the second step portion and the third step portion are located on the same side of the first bracket 2000 (for example, above the first bracket 2000), so as to prevent the tube body 3100 of the spirit bubble 3000 from accidentally coming off from this side of the first bracket 2000, and improve the stability of the first bracket 2000 for fixing the spirit bubble 3000.

The third connecting section 2100 and the fourth connecting section 2200 are further provided with a fourth auxiliary fixing portion 2500 for fixing the spirit bubble 3000. For example, a middle part of the third connecting section 2100 and a middle part of the fourth connecting section 2200 are each provided with a first protrusion portion protruding towards the spirit bubble 3000. The two first protrusion portions are both located at the other side of the first bracket 2000 (for example, below the first bracket 2000) for clamping and fixing the tube body 3100 of the spirit bubble 3000 together, so as to prevent the tube body 3100 of the spirit bubble 3000 from accidentally coming off from this side of the first bracket 2000, and improve the stability of the first bracket 2000 for fixing the spirit bubble 3000. In addition, as long as the operator applies pressure on the tube body 3100 of the spirit bubble 3000, when the pressure reaches enough, the tube body 3100 of the spirit bubble 3000 will slide into the first recess portion 2001 from a position between the two first protrusion portions, so as to achieve the installation and fixation between the tube body 3100 of the spirit bubble 3000 and the first bracket 2000, or the tube body 3100 of the spirit bubble 3000 will slide out of the first recess portion 2001 from a position between the two first protrusion portions, so as to achieve a detachable fixed connection manner between the tube body 3100 of the spirit bubble 3000 and the first bracket 2000.

Certainly, the first auxiliary fixing portion 2104, the second auxiliary fixing portion 2204, the third auxiliary fixing portion 2400, and the fourth auxiliary fixing portion 2500 may also be partially applied as long as the spirit bubble 3000 (actually, the tube body 3100 of the spirit bubble 3000) can be steadily fixed in the first recess portion 2001.

Preferably, the second bracket 4000 includes a fifth connecting section 4100 and a sixth connecting section 4200. The fifth connecting section 4100 and the sixth connecting section 4200 are disposed in parallel. A second end 4102 of the fifth connecting section is connected to a second end 4202 of the sixth connecting section via a fourth connecting portion 4500, so as to form a second recess portion 4001 for matching the second connecting portion 2300 of the first bracket 2000. That is to say, the second connecting portion 2300 cooperates with the second recess portion 4001 to achieve a movable connection between the first end of the first bracket 2000 and the second bracket 4000. For example, a joint therebetween is designed with a rack-shaped friction positioning structure.

The second bracket 4000 is provided with an angle value scale 4300. For example, a front side of the fifth connecting section 4100 is provided with the angle value scale 4300 for displaying the angle between the first bracket 2000 and the base 1000. A front side of the sixth connecting section 4200 is provided with a plurality of first bumps 4302. A first groove 4303 is formed between the adjacent first bumps 4302. The first grooves 4303 correspond to angle values of different angles between the first bracket 2000 and the base 1000.

In Embodiment 2, the angle value scale 4300 ranges from 10° to 45°. The angle scale value 4301 which is a multiple of 5 will be identified by a number, so as to facilitate the operator to recognize approximate positions corresponding to different angles. Meanwhile, the first grooves 4303 are uniformly distributed, and correspond to angle values. The first grooves 4303 are more accurate in positioning the angle value scale 4300.

An arc-shaped step portion is disposed behind the second bracket 4000. For example, a rear side of the fifth connecting section 4100 is provided with an arc-shaped fifth step portion 4105, and a rear side of the sixth connecting section 4200 is provided with an arc-shaped sixth step portion 4205.

The first end 2101 of the third connecting section and one side of the second connecting portion 2300 form a third bump 2105. The first end 2201 of the fourth connecting section and the other side of the second connecting portion 2300 form a fourth bump 2205. The third bump 2105 moves along the fifth step portion 4105 in an arc shape, and the fourth bump 2205 moves along the sixth step portion 4205 in an arc shape. That is to say, the first end of the first bracket 2000 moves along the second bracket 4000 in an arc shape to achieve the angular adjustment between the first bracket 2000 and the base 1000.

Preferably, a side of the fifth connecting section 4100 corresponding to the second recess portion 4001 is provided with a plurality of tooth portions 4002; and/or a side of the sixth connecting section 4200 corresponding to the second recess portion 4001 is provided with a plurality of tooth portions 4002. That is to say, a single tooth portion 4002 has a convex tooth shape, and the tooth portions 4002 correspond to one or two sides of the second recess portion 4001. For example, 36 tooth portions 4002 are respectively disposed on two sides of the second recess portion 4001 in Embodiment 2, and the positions of the tooth portions 4002 on the two sides correspond to each other to form a group of tooth portions 4002, so as to achieve an angle change of 1° corresponding to each group of tooth portions 4002, thereby also assisting the operator in positioning the indicating portion 2600 on a specific value of the angle value scale 4300, and improving the accuracy of the angle adjustment between the first bracket 2000 and the base 1000. Certainly, this is only an example, and it is also possible to adjust a specific number and/or an interval of scale values represented by the first grooves 4303 by adjusting a range value of the angle value scale 4300. One or two sides of the second connecting portion 2300 are provided with raised ribs 2301, and the raised ribs 2301 match the tooth portions 4002. In Embodiment 2, left and right sides of the second connecting portion 2300 are each provided with a raised rib 2301, and the two raised ribs 2301 match the corresponding tooth portions 4002 on the two sides of the second recess portion 4001. When the angle between the first bracket 2000 and the base 1000 needs to be adjusted, the operator pushes the first end of the first bracket 2000 and the indicating portion 2600 to move in an arc shape, and the raised ribs 2301 can slide in the tooth portions 4002. When the first end of the first bracket 2000 and the indicating portion 2600 move to a scale position corresponding to a specified angle, the operator releases the first end of the first bracket 2000 and/or the indicating portion 2600, the raised ribs 2301 and the corresponding tooth portions 4002 form a clamping state, so as to assist in fixing the angle of the first bracket 2000. When a normal vibration is caused by knife sharpening and/or due to a grinding action in the case of using the device for observing and positioning a sharpening angle of a cutting edge, there is no change in the angle between the first bracket 2000 and the base 1000 to avoid indirectly affecting the accuracy of the knife sharpening.

The second connecting portion 2300 (preferably a front side of the second connecting portion 2300, namely, a side of the second connecting portion 2300 facing away from the spirit bubble 3000, when the first bracket 2000 is received into the base 1000, a front end of the second connecting portion 2300) is provided with an indicating portion 2600 for indicating the angle between the first bracket 2000 and the base 1000.

The indicating portion 2600 includes sharp indicating heads 2601 located at two ends of the indicating portion 2600. The two sharp indicating heads 2601 respectively correspond to one raised rib 2301, so as to ensure that the angle value scale 4300 pointed by the indicating portion 2600 coincides with the angle between the first bracket 2000 and the base 1000. A horizontal indicating slot 2602 is provided between the two sharp indicating heads 2601. The operator may align the sharp indicating heads 2601 with the angle value scale 4300 (including an identifier of the angle value scale 4300 and/or each first groove 4303), or align the indicating slot 2602 with the angle scale value 4301, or simultaneously align the sharp indicating heads 2601 and the indicating slot 2602 with the angle scale value 4300, and finally align the indicating portion 2600 with the angle scale value 4300, so as to ensure the accuracy of the magnitude of the included angle between the first bracket 2000 and the base 1000.

The two sharp indicating heads 2601, the third bump 2105 and the fourth bump 2205 respectively form two dents 2700, and the two raised ribs 2301 are located in the corresponding dents 2700. In addition, the two dents 2700 also form a locking action on the tooth portions 4002. That is to say, the second connecting portion 2300 may move in the second recess portion 4001 in an arc shape, but the second connecting portion 2300 and the second bracket 4000 do not separate, thereby ensuring the stability of the movable connection between the first bracket 2000 and the second bracket 4000 and the stability of an overall structure of the device for observing and positioning a sharpening angle of a cutting edge.

The rear side of the first end 4101 of the fifth connecting section and the rear side of the first end 4201 of the sixth connecting section are connected via a third connecting portion 4400. The third connecting portion 4400 avoids interference of the indicating portion 2600 being completely embedded in the middle of the first end 4101 of the fifth connecting section and the first end 4201 of the sixth connecting section, but also serves to strengthen the stability of the structure of the second bracket 4000. At this moment, the second bracket 4000 is quadrilateral. In addition, when the second bracket 4000 is turned up, the first end of the first bracket 2000 can be lifted up by a certain height using the third connecting portion 4400 (for example, the indicating portion 2600 at this moment is flat with an initial scale), so as to facilitate the subsequent lifting of the first end of the first bracket 2000, and to achieve the angular adjustment of the included angle between the first bracket 2000 and the base 1000.

One or two sides of the fourth connecting portion 4500 are provided with a second groove 4501. An inner side of the second end 1102 of the first connecting section and/or an inner side of the second end 1202 of the second connecting section are provided with a second protrusion portion 1500. The second protrusion portion 1500 matches the second groove 4501 to achieve a detachable connection between the fourth connecting portion 4500 and the base 1000.

Preferably, the second end 1102 of the first connecting section is provided with a first shaft hole 1103, and the second end 1202 of the second connecting section is provided with a second shaft hole 1203. The first end 1101 of the first connecting section is provided with a third shaft hole 1104, and the first end 1201 of the second connecting section is provided with a fourth shaft hole 1204. The second end 2102 of the third connecting section is provided with a first shaft 2103. The second end 2202 of the fourth connecting section is provided with a second shaft 2203. The first shaft 2103 matches the first shaft hole 1103. That is, the first shaft 2103 is embedded in the first shaft hole 1103, so as to assist in forming a rotatable connection between the second end 2102 of the third connecting section and the second end 1102 of the first connecting section. The second shaft 2203 matches the second shaft hole 1203. That is, the second shaft 2203 is embedded in the second shaft hole 1203, so as to assist in forming a rotatable connection between the second end 2202 of the fourth connecting section and the second end 1202 of the second connecting section, thereby integrally achieving the rotatable connection between the first bracket 2000 and the base 1000, and achieving the turnover movement of the first bracket 2000 relative to the base 1000.

Preferably, an outer side of the first end 4101 of the fifth connecting section is provided with a third shaft 4103. An outer side of the first end 4201 of the sixth connecting section is provided with a fourth shaft 4203. The third shaft 4103 matches the third shaft hole 1104. That is, the third shaft 4103 is embedded in the third shaft hole 1104, so as to assist in forming a rotatable connection between the first end 4101 of the fifth connecting section and the first end 1101 of the first connecting section. The fourth shaft 4203 matches the fourth shaft hole 1204. That is, the fourth shaft 4203 is embedded in the fourth shaft hole 1204, so as to assist in forming a rotatable connection between the first end 4201 of the sixth connecting section and the first end 1201 of the second connecting section, thereby integrally achieving the rotatable connection between the second bracket 4000 and the base 1000, and achieving the turnover movement of the second bracket 4000 relative to the base 1000.

Preferably, an outer end of the third shaft 4103 is provided with a third rectangular block 4104. An outer end of the fourth shaft 4203 is provided with a fourth rectangular block 4204. The first end 1101 of the first connecting section is provided with a third rectangular hole 1105. The third shaft hole 1104 is located at the middle of the third rectangular hole 1105. The first end 1201 of the second connecting section is provided with a fourth rectangular hole 1205. The fourth shaft hole 1204 is located at the middle of the fourth rectangular hole 1205. The third rectangular block 4104 matches the third rectangular hole 1105. That is, after the third rectangular block 4104 is embedded in the third rectangular hole 1105, the installation between the first end 4101 of the fifth connecting section and the first end 1101 of the first connecting section is achieved. The fourth rectangular block 4204 matches the fourth rectangular hole 1205. That is, after the fourth rectangular block 4204 is embedded in the fourth rectangular hole 1205, the installation between the first end 4201 of the sixth connecting section and the first end 1201 of the second connecting section is achieved. When the second bracket 4000 is slipped relative to the base 1000, the third rectangular block 4104 and the third rectangular hole 1105 can achieve the interlocking between the first end 4101 of the fifth connecting section and the first end 1101 of the first connecting section, and the fourth rectangular block 4204 and the fourth rectangular hole 1205 can achieve the interlocking between the first end 4201 of the sixth connecting section and the first end 1201 of the second connecting section. With this design, metal fixing members used in the prior art can be eliminated, punching is not required, and the assembly is simplified. The second bracket 4000 and the base 1000 are formed by using an injection molding process, the product has a high forming precision and a high yield, and the installation between the second bracket 4000 and the base 1000 is simple and fast, so as to effectively reduce the processing costs and assembly costs of the second bracket 4000 and the base 1000. This structure provides the product (device for observing and positioning a sharpening angle of a cutting edge) with a clear optimal structural strength (the possibility of separating the shafts from the holes can be eliminated) and a greater cost advantage (simpler production and assembly). That is to say, the third rectangular block 4104 matches the third rectangular hole 1105, and the third shaft 4103 matches the third shaft hole 1104. The fourth rectangular block 4204 matches the fourth rectangular hole 1205, and the fourth shaft 4203 matches the fourth shaft hole 1204.

In Embodiment 2, the third rectangular block 4104 matches the third rectangular hole 1105 to achieve staggered locking, and the fourth rectangular block 4204 matches the fourth rectangular hole 1205 to achieve staggered locking. That is, the third rectangular block 4104 is interlocked with the third rectangular hole 1105 in a staggered manner based on the third shaft 4103. The fourth rectangular block 4204 is interlocked with the fourth rectangular hole 1205 in a staggered manner based on the fourth shaft 4203. For example, the third rectangular block 4104 and the fourth rectangular block 4204 are both vertical to the second bracket 4000. The third rectangular hole 1105 and the fourth rectangular hole 1205 are both at an included angle (for example, at 45°) with the base 1000. When the angle of the third rectangular block 4104 corresponds to the angle of the third rectangular hole 1105 (for example, the third rectangular block and the third rectangular hole overlap in angle or overlap in position) and the angle of the fourth rectangular block 4204 corresponds to the angle of the fourth rectangular hole 1205 (for example, the fourth rectangular block and the fourth rectangular hole overlap in angle or overlap in position) so as to realize the installation operation between the second bracket 4000 and the base 1000, the second bracket 4000 and the base 1000 are at an obtuse angle. When the base 1000, the first bracket 2000 and the second bracket 4000 are integrally installed, regardless of how the second bracket 4000 is rotated or turned over (at this moment, the third shaft 4103 is turned over in cooperation with the third shaft hole 1104, and the fourth shaft 4203 is turned over in cooperation with the fourth shaft hole 1204), the angle between the second bracket 4000 and the base 1000 does not form an obtuse angle. That is to say, after the device for observing and positioning a sharpening angle of a cutting edge is installed, the angle of the third rectangular block 4104 and the angle of the third rectangular hole 1105 cannot correspond again (that is to say, the third rectangular block and the third rectangular hole cannot be disengaged or separated), and the angle of the fourth rectangular block 4204 and the angle of the fourth rectangular hole 1205 cannot correspond again (that is to say, the fourth rectangular block and the fourth rectangular hole cannot be disengaged or separated). Therefore, the third rectangular block 4104 and the third rectangular hole 1105 form a stable interlocking structure, and the fourth rectangular block 4204 and the fourth rectangular hole 1205 form a stable interlocking structure. This design can effectively prevent the accidental falling off between the second bracket 4000 and the base 1000 after the installation, and improve the structural stability of a connection structure of the second bracket 4000 and the base 1000.

It should be noted that regardless of the type or magnitude of the angle between the third rectangular block 4104, the fourth rectangular block 4204 and the second bracket 4000, and the type or magnitude of the angle between the third rectangular hole 1105, in the presence of mutual cooperation, the fourth rectangular hole 1205 and the base 1000, the staggered locking (or staggered interlocking) can be achieved by matching the third rectangular block 4104 with the third rectangular hole 1105, and the staggered locking (or staggered interlocking) can be achieved by matching the fourth rectangular block 4204 with the fourth rectangular hole 1205. That is, this falls within the scope of protection of this patent.

When the base 1000 is not provided with the hanging hole 1401, the first connecting portion 1300 is linear or the outer side of the first connecting portion 1300 has a plane, and the first connecting portion 1300 is vertical to the first connecting section 1100 and the second connecting section 1200 (or the plane on the outer side of the first connecting portion 1300 is vertical to the first connecting section 1100 and the second connecting section 1200). That is to say, the first connecting portion 1300 (or the plane on the outer side of the first connecting portion 1300) is indirectly vertical to the spirit bubble 3000. This design can measure whether an object is in a vertical or horizontal state through the spirit bubble 3000. For example, the first connecting portion 1300 (or the plane on the outer side of the first connecting portion 1300) is placed against the surface of an object to be subjected to angle measurement, and the tube body 3100 of the spirit bubble 3000 keeps placed in a horizontal direction. If the level bubble 3102 in the tube body 3100 is located in the middle space among the equally-sized spaces of the tube body 3100, the surface of the object to be subjected to angle measurement is in a vertical state. If the level bubble 3102 in the tube body 3100 is located outside the middle space among the equally-sized spaces of the tube body 3100, the surface of the object to be subjected to angle measurement deviates from the vertical state.

However, the base 1000 in Embodiment 2 is provided with a hanging hole 1401. The hanging hole 1401 is located outside the first connecting portion 1300. For example, the second end 1102 of the first connecting section and the second end 1202 of the second connecting section are both provided with an extension section extending outwards and an extension portion 1400 formed by the intersection of the two extension sections. The hanging hole 1401 is formed between the extension portion 1400 and the first connecting portion 1300. At this moment, an outer side surface of the extension portion 1400 may also be linear or the outer side of the extension portion 1400 has a plane, and the extension portion 1400 (or the plane on the outer side of the extension portion 1400) is vertical to the first connecting section 1100 and the second connecting section 1200. This design can measure whether an object is in a vertical state through the spirit bubble 3000. For example, the extension portion 1400 (or the plane on the outer side of the extension portion 1400) is placed against the surface of an object to be subjected to angle measurement, and the tube body 3100 of the spirit bubble 3000 remains placed in a horizontal direction. If the level bubble 3102 in the tube body 3100 is located in the middle space among the equally-sized spaces of the tube body 3100, the surface of the object to be subjected to angle measurement is in a vertical state. If the level bubble 3102 in the tube body 3100 is located outside the middle space among the equally-sized spaces of the tube body 3100, the surface of the object to be subjected to angle measurement deviates from the vertical state. The extension portion 1400 also assists in improving the structural stability of the base 1000 (particularly the base 1000 of the device for observing and positioning a sharpening angle of a cutting edge, which has been integrally installed).

Preferably, a side of the first connecting portion 1300 facing the first bracket 2000 is provided with a first recess 1301. A side of the fourth connecting portion 4500 facing the base 1000 is provided with a fourth recess 4502. The first recess 1301 is in positional correspondence to the fourth recess 4502. That is to say, when the device for observing and positioning a sharpening angle of a cutting edge is in a received state, the first bracket 2000 is embedded into the third recess portion 1004, and the second bracket 4000 is closely adhered to the base 1000 (namely, the second groove 4501 and the second protrusion portion 1500 are clamped). At this moment, the first recess 1301 and the fourth recess 4502 together form a hole or a notch for the operator to insert a fingernail or another tool, so as to facilitate the quick separation of the second bracket 4000 from the base 1000. That is, the operation of quickly turning up the second bracket 4000 can be accomplished to improve the use efficiency.

In Embodiment 2, the steps of installing the components in the device for observing and positioning a sharpening angle of a cutting edge are as follows:

First, the first end of the second bracket 4000 is installed with the first end of the base 1000. That is, the third rectangular block 4104 and the third shaft 4103 are embedded in the third shaft 4103 and the third shaft hole 1104, and the fourth rectangular block 4204 and the fourth shaft 4203 are embedded in the fourth shaft 4203 and the fourth shaft hole 1204. At this moment, the second bracket 4000 and the base 1000 may be turned over. Meanwhile, the base 1000, supported by the third connecting portion 4400, also indirectly achieves a quadrilateral structure, and has better stability.

Secondly, the first end of the first bracket 2000 is obliquely embedded into the second recess portion 4001, the raised ribs 2301 correspond to the tooth portions 4002, and the first bracket 2000 is rotated, whereby the two dents 2700 of the first bracket 2000 are engaged with the corresponding tooth portions 4002, and the dents 2700 are movably connected to the tooth portions 4002.

Secondly, the second end of the first bracket 2000 is installed with the second end of the base 1000. That is, the first shaft 2103 is embedded into the first shaft hole 1103, and the second shaft 2203 is embedded into the second shaft hole 1203. At this moment, the first bracket 2000 and the base 1000 may be turned over. It should be noted that the second end 2102 of the third connecting section and the second end 2202 of the fourth connecting section are not connected, and there is an elastic gap therebetween. The size of the gap is slightly greater than the space required for shaft assembly (the elastic gap refers to space where the second end 2102 of the third connecting section and the second end 2202 of the fourth connecting section can approach each other, so as to align the first shaft 2103 with the first shaft hole 1103, and align the second shaft 2203 with the second shaft hole 1203; when the second end 2102 of the third connecting section and the second end 2202 of the fourth connecting section are released, the first shaft 2103 can be inserted into the first shaft hole 1103, and the second shaft 2203 can be inserted into the second shaft hole 1203, that is to say, the elastic space is greater than the space required for assembling the first shaft hole 1103 and the second shaft hole 1203). In this way, the operator can press the second end 2102 of the third connecting section and the second end 2202 of the fourth connecting section against the position therebetween, so that the distance therebetween is reduced, thereby facilitating the insertion into the third recess portion 1004 of the base 1000. When the first shaft 2103 is aligned with the first shaft hole 1103 and the second shaft 2203 is aligned with the second shaft hole 1203, the operator releases the second end 2102 of the third connecting section and the second end 2202 of the fourth connecting section, and after the two ends rebound, the two ends are respectively embedded in the corresponding first shaft hole 1103 and second shaft hole 1203. The installation between the first bracket 2000 and the base 1000 is more convenient, and the assembly working efficiency is improved. When the first bracket 2000 cannot be rotated again, the locked state of the dents 2700 and the tooth portions 4002 of the first bracket 2000 cannot be contacted, and the first end of the first bracket 2000 can only achieve a sliding or arc-shaped movement along the tooth portions 4002 of the second bracket 4000. At this moment, the device for observing and positioning a sharpening angle of a cutting edge has better overall stability.

Finally, the spirit bubble 3000 is loaded into the first recess portion 2001. At this moment, the spirit bubble 3000 also limits the distance between the second end 2102 of the third connecting section and the second end 2202 of the fourth connecting section. That is, the second end 2102 of the third connecting section and the second end 2202 of the fourth connecting section cannot be elastically deformed and displaced therebetween, the first shaft 2103 cannot be separated from the first shaft hole 1103, and the second shaft 2203 cannot be separated from the second shaft hole 1203. Therefore, the connection between the second end of the first bracket 2000 and the second end of the base 1000 is more stable, thereby improving the overall stability of the device for observing and positioning a sharpening angle of a cutting edge.

The order of the foregoing installation steps cannot be changed; otherwise, the installation cannot be completed. The structures of the components are constrained to each other and cooperate with each other to achieve the integral installation of the device for observing and positioning a sharpening angle of a cutting edge, so as to satisfy the requirements for the integral stability of the device for observing and positioning a sharpening angle of a cutting edge. Meanwhile, there is no need for an additional auxiliary installation member (for example, a bolt or a hinge, etc.). The installation operation of each component is simple and convenient, and the production cost is low.

In Embodiment 2, the device for observing and positioning a sharpening angle of a cutting edge may be used in the following scenarios:

The first scenario is angle assistance for manual knife grinding. That is, a knife with a single-sided sharpening angle in a range of 10-45° or a knife (for example, a knife with a V-shaped cutting edge) with a double-sided sharpening angle in a range of 10-45° is manually ground or sharpened on a sharpening stone (which may also be an edge grinding tool having a grinding plane for plane grinding such as a board or sheet or abrasive paper or ceramic grinding sheet or cowhide board for a sharpening stone).

Firstly, the base 1000 is adsorbed on one side surface of the knife body (for example, a blade face or a blade edge of a knife). At this moment, the cutting edge 5001 (for example, the cutting edge plane 5007 between the cutting edge 5008 and the edge line 5006, or the blade edge 5005 between the edge line 5006 and the edge line 5004) to be ground is located on the other side surface of the knife 5000. At this moment, the width of the blade face of the knife does not limit or affect the effect of keeping the edge sharpening angle of the knife by using the device for observing and positioning a sharpening angle of a cutting edge. That is to say, the device for observing and positioning a sharpening angle of a cutting edge is applicable to various knives with different widths of blade faces, as long as the device for observing and positioning a sharpening angle of a cutting edge can be placed on the blade face of the knife, which reflects the wide applicability and wide application range of the device for observing and positioning a sharpening angle of a cutting edge.

Secondly, the second bracket 4000 is turned up, whereby the first bracket 2000 is also turned up synchronously with the spirit bubble 3000, and the sharp indicating heads 2601 and/or the indicating slot 2602 of the indicating portion 2600 are positioned on a specified angle value scale 4300 (that is, an angle 5003 required for edge grinding of the knife 5000). At this moment, the included angle formed by the first bracket 2000 and the base 1000 matches the specified angle value scale 4300.

Thirdly, the cutting edge is placed on the other side of the knife on the sharpening stone (board) 6000, and the position of the level bubble 3102 is observed, so as to adjust a knife angle (namely, an angle between the knife and the sharpening stone). When the level bubble 3102 is at the middle (namely, the level bubble 3102 is located in the middle space among the equally-sized spaces of the tube body 3100), the knife is at a correct sharpening angle.

Finally, the level bubble 3102 is kept at the middle to start grinding the knife, and the knife may be stopped at any position on the sharpening stone (board) when needed. The sharpening angle is corrected by observing the position of the level bubble 3102, or the position of the level bubble 3102 is observed anytime during the knife grinding, so as to correct the sharpening angle in time, thereby ensuring that the knife keeps sharpening at the correct edge sharpening angle, and the cutting edge sharpening effect is better. In the grinding action, the level bubble will also be in a continuous dynamic state. As long as the level bubble keeps within the two indicating lines, it is considered that the spirit bubble is in a horizontal state. At this moment, the cutting edge sharpening angle of the knife is within a reasonable range, which can meet the cutting edge sharpening angle requirements of the knife.

In this process, a relative position between the device for observing and positioning a sharpening angle of a cutting edge and the knife remains unchanged, and the sharpening angle of the knife may be displayed through the angle value scale 4300 and the indicating portion 2600. In addition, the device for observing and positioning a sharpening angle of a cutting edge is not in contact with the sharpening stone (board), and the device for observing and positioning a sharpening angle of a cutting edge is prevented from abrading with the sharpening stone (board).

The second scenario is angle assistance of an abrasive band-type sharpener. That is, a knife with a sharpening angle in a range of 10-45° is manually ground by using the abrasive band-type sharpener. The use method and working principle of the device for observing and positioning a sharpening angle of a cutting edge are basically the same as the foregoing first scenario, except that the sharpening stone (board) is replaced with an abrasive band of the abrasive band-type sharpener. The cutting edge is ground by using the abrasive band, so that the sharpening speed is high. At this moment, the knife and the device for observing and positioning a sharpening angle of a cutting edge are fixed, while the abrasive band rotates to sharpen the cutting edge. The sharpening angle of the cutting edge is more precise as long as the operator keeps the level bubble 3102 at the middle (namely, the level bubble 3102 is in the middle space among the equally-sized spaces of the tube body 3100), namely, the knife is at the correct grinding or sharpening angle.

The third scenario is another scenario requiring angle detection.

In the horizontal assembly work, when it is necessary to perform horizontal angle detection on a workpiece, a device for observing and positioning a sharpening angle of a cutting edge (preferably a device for observing and positioning a sharpening angle of a cutting edge in a folded state, that is to say, both the first bracket 2000 and the spirit bubble 3000 are received in the third recess portion 1004 of the base 1000) is directly placed on a plane of the workpiece to be detected, and the position of the level bubble 3102 can be observed. If the level bubble 3102 is at the middle (namely, the level bubble 3102 is located in the middle space among the equally-sized spaces of the tube body 3100), the plane is in a horizontal state, otherwise, the plane is in an inclined state. Because of a small product volume, the device for observing and positioning a sharpening angle of a cutting edge may be carried with and used anytime. The horizontal condition of the corresponding plane of the workpiece or article is determined by using the spirit bubble 3000 of the device for observing and positioning a sharpening angle of a cutting edge.

When it is necessary to perform angular assembly work on a workpiece, the base 1000 of the device for observing and positioning a sharpening angle of a cutting edge is adsorbed or fixed by other means (adhered or the base 1000 being pressed by an operator) on a surface to be detected of the workpiece. The second bracket 4000 is opened, the first bracket 2000 is lifted, an indicating portion 2600 is adjusted to the specified angle scale value 4301, and then a relative position between the device for observing and positioning a sharpening angle of a cutting edge and the surface to be detected of the workpiece is kept unchanged. The device for observing and positioning a sharpening angle of a cutting edge is synchronously rotated clockwise or counterclockwise with the workpiece until the level bubble 3102 is at the middle (namely, the level bubble 3102 is located in the middle space among the equally-sized spaces of the tube body 3100). At this moment, the angle of the surface of the workpiece to be detected is a specified angle (namely, the angle of the workpiece is the same as the specified angle scale value 4301), whereby the workpiece can be accurately installed angularly, and the whole operation is simple and convenient.

Figure 16:
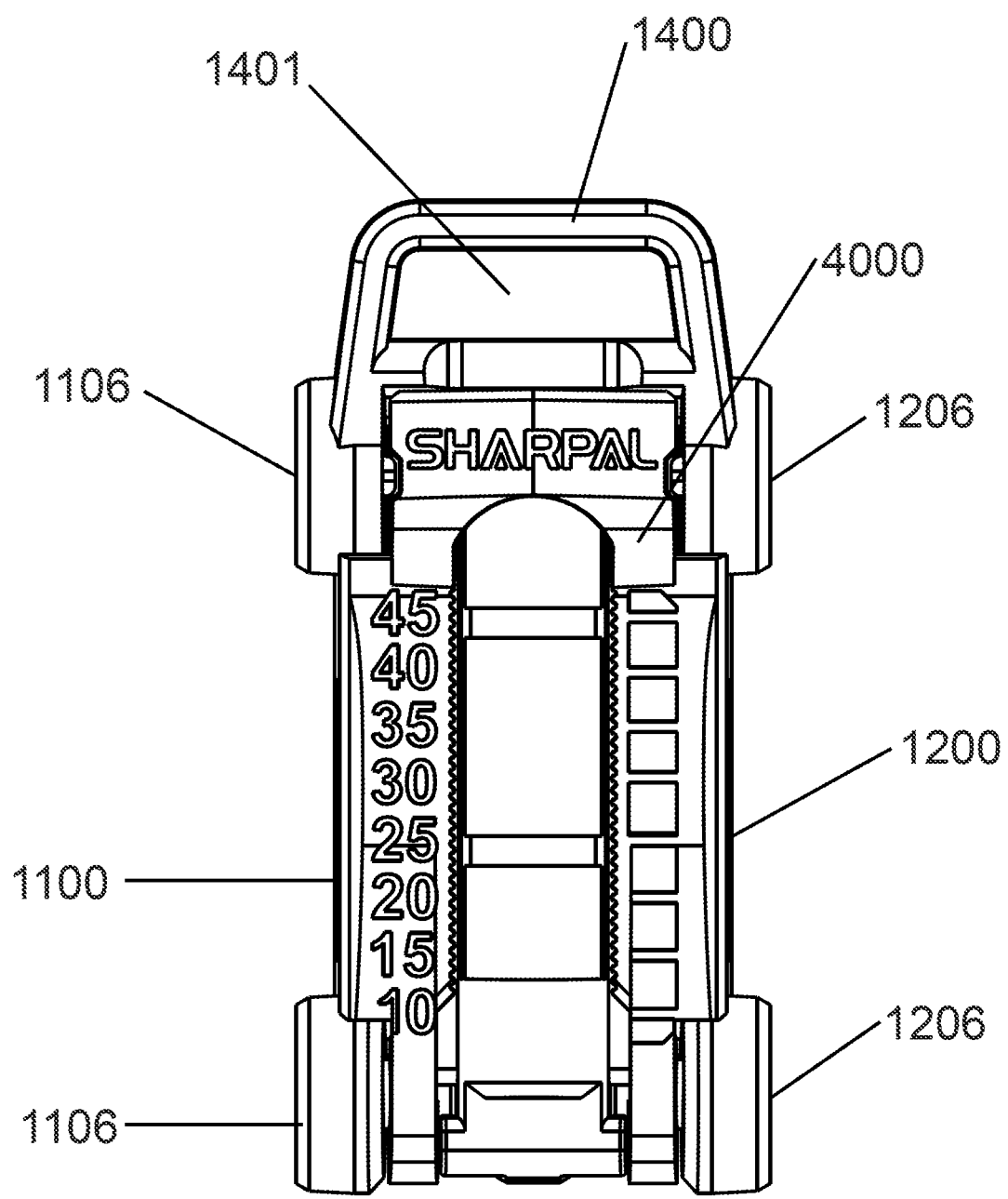
FIG. 16 shows a bottom view of a device for observing and positioning a sharpening angle of a cutting edge in Embodiment 3 (folded state).
Figure 17:
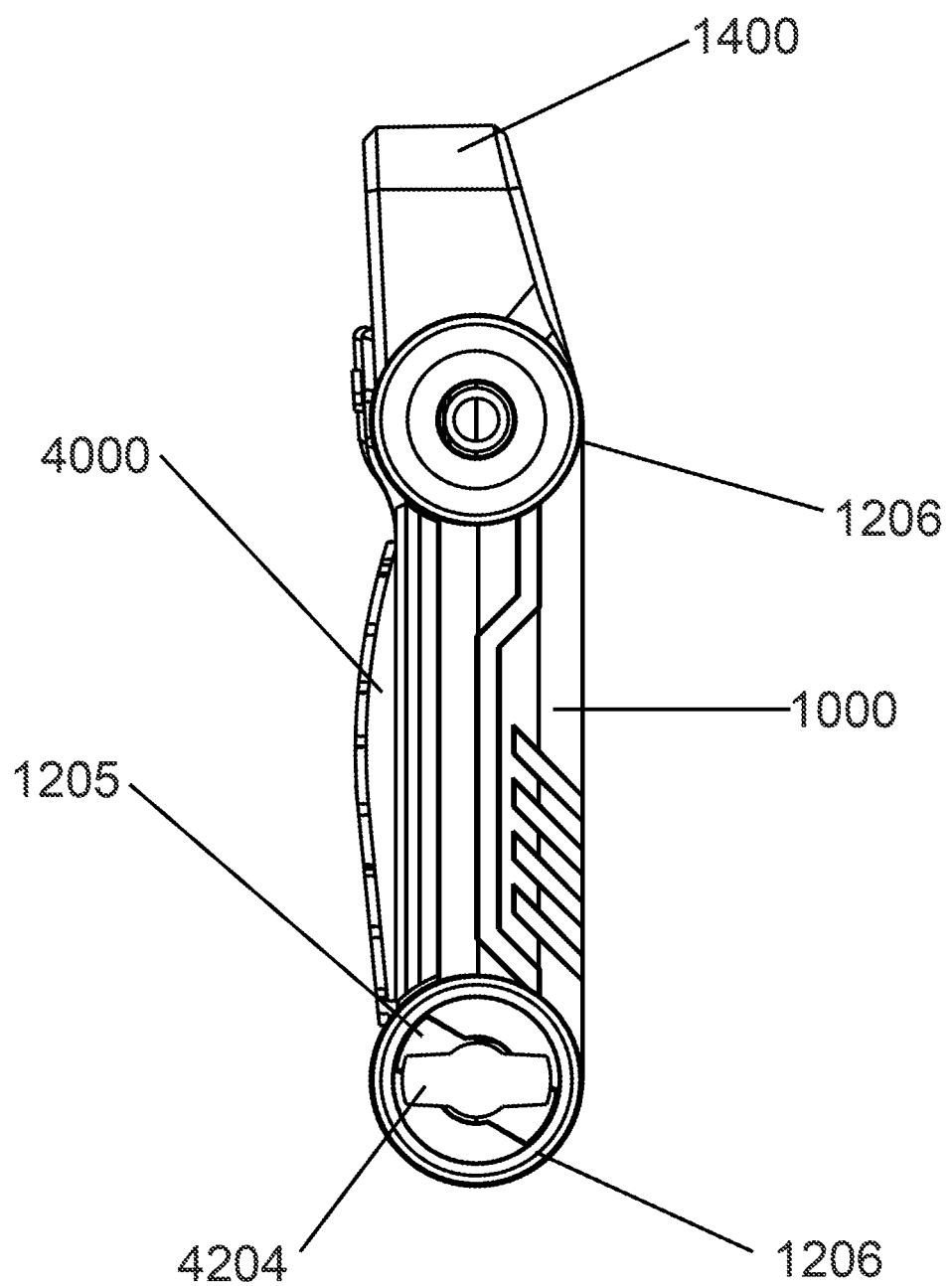
FIG. 17 shows a left view of a device for observing and positioning a sharpening angle of a cutting edge in Embodiment 3 (folded state).

Referring to FIGS. 16 and 17, a specific embodiment 3 is shown. Embodiment 3 provides a device for observing and positioning a sharpening angle of a cutting edge. An outermost side of the first connecting section 1100 is provided with two first highest points 1106. The first highest points 1106 are positions where the outermost side of the first connecting section 1100 is most protruding. A straight line formed by a line connecting the two first highest points 1106 is parallel to the spirit bubble 3000, and the height of an outer end of the third rectangular block 4104 does not exceed the height of the first highest points 1106. That is to say, the outer end of the third rectangular block 4104 does not exceed the straight line formed by the line connecting the two first highest points 1106. When the first connecting section 1100 corresponding to the base 1000 is in contact with any plane, the spirit bubble 3000 is in a horizontal state with the plane, so as to use the spirit bubble to measure whether the plane is horizontal.

An outermost side of the second connecting section 1200 is provided with two second highest points 1206. The second highest points 1206 are positions where the outermost side of the second connecting section 1200 is most protruding. A straight line formed by a line connecting the two second highest points 1206 is parallel to the spirit bubble 3000, and the height of an outer end of the fourth rectangular block 4204 does not exceed the height of the second highest points 1206. That is to say, the outer end of the fourth rectangular block 4204 does not exceed the straight line formed by the line connecting the second highest points 1206. When the second connecting section 1200 corresponding to the base 1000 is in contact with any plane, the spirit bubble 3000 is in a horizontal state with the plane, so as to use the spirit bubble to measure whether the plane is horizontal.

The plane on the bottom of the base 1000 is parallel to the spirit bubble 3000, and when the bottom of the base 1000 is placed on the knife body, the spirit bubble 3000 is parallel to the center line of the knife.

The second end 1102 of the first connecting section and the second end 1202 of the second connecting section are both provided with an extension section extending outwards and an extension portion 1400 formed by the intersection of the two extension sections. A hanging hole 1401 is formed between the extension portion 1400 and the first connecting portion 1300. An outer side surface of the extension portion 1400 has a linear or planar shape. The outer side surface of the extension portion 1400 is in a vertical state with the spirit bubble 3000.

A straight line formed by a line connecting the first end 1101 of the first connecting section and the first end 1201 of the second connecting section is parallel to the spirit bubble 3000.

Such the device for observing and positioning a sharpening angle of a cutting edge has at least three faces (left and right viewing angles and bottom viewing angles) parallel to the spirit bubble 3000, and at least two faces (front viewing angle and rear viewing angle) vertical to the spirit bubble 3000. When the device for observing and positioning a sharpening angle of a cutting edge is in a folded state, it is possible to use one or more of the foregoing five faces in combination with the spirit bubble 3000 to measure whether another object plane is horizontal or vertical.

Top, bottom, front side, rear side, left, right, front, back, horizontal, vertical, and other orientation terms involved herein are for ease of description, but are not intended as limitations on the product, as the corresponding orientation may change if the product is rotated or angled.

As used herein, the term "and/or" includes any and all combinations of one or more of the associated listed items.

The foregoing descriptions are only the preferred embodiments of the present invention, and are not intended to limit the patent scope of the present invention. Any equivalent structure or equivalent process transformation made by using the contents of the description and drawings of the present invention, or directly or indirectly applied to other related technical fields, is similarly included in the scope of patent protection of the present invention.

What is claimed is:

1. A device for observing and positioning a sharpening angle of a cutting edge, comprising: a spirit bubble (3000) for observing a change of a sharpening angle of a cutting edge and positioning the sharpening angle of the cutting edge, and a base (1000) for fixing the device on a knife body, the spirit bubble (3000) being rotatably connected to the base (1000) for adjusting an angle between the spirit bubble (3000) and the base (1000), and further comprising: a first bracket (2000) and a second bracket (4000) for fixing the spirit bubble (3000), wherein a first end of the base (1000) is rotatably connected to a first end of the second bracket (4000), a second end of the base (1000) is rotatably connected to a second end of the first bracket (2000), and a first end of the first bracket (2000) is movably connected to the second bracket (4000) for adjusting the magnitude of a first included angle (1001) between the first bracket (2000) and the base (1000).

2. The device for observing and positioning a sharpening angle of a cutting edge according to claim 1, wherein the spirit bubble (3000) is axially rotatably connected to the base (1000).

3. The device for observing and positioning a sharpening angle of a cutting edge according to claim 1, wherein the first end of the base (1000) is axially rotatably connected to the first end of the second bracket (4000), and the second end of the base (1000) is axially rotatably connected to the second end of the first bracket (2000).

4. The device for observing and positioning a sharpening angle of a cutting edge according to claim 3, wherein the base (1000) comprises a first connecting section (1100) and a second connecting section (1200), a second end (1102) of the first connecting section being connected to a second end (1202) of the second connecting section via a first connecting portion (1300), so as to form a third recess portion (1004) for receiving the first bracket (2000) and the spirit bubble (3000).

5. The device for observing and positioning a sharpening angle of a cutting edge according to claim 4, wherein the first bracket (2000) comprises a third connecting section (2100) and a fourth connecting section (2200), a first end (2101) of the third connecting section being connected to a first end (2201) of the fourth connecting section via a second connecting portion (2300), so as to form a first recess portion (2001) for placing the spirit bubble (3000).

6. The device for observing and positioning a sharpening angle of a cutting edge according to claim 5, wherein the second bracket (4000) comprises a fifth connecting section (4100) and a sixth connecting section (4200), a second end (4102) of the fifth connecting section being connected to a second end (4202) of the sixth connecting section via a fourth connecting portion (4500), so as to form a second recess portion (4001) for matching the second connecting portion (2300) of the first bracket (2000).

7. The device for observing and positioning a sharpening angle of a cutting edge according to claim 6, wherein the second end (2102) of the third connecting section is provided with a first auxiliary fixing portion (2104) for fixing the spirit bubble (3000); and/or the second end (2202) of the fourth connecting section is provided with a second auxiliary fixing portion (2204) for fixing the spirit bubble (3000);
and/or a third auxiliary fixing portion (2400) for fixing the spirit bubble (3000) is disposed between the first end (2101) of the third connecting section and the first end (2201) of the fourth connecting section; and/or the third connecting section (2100) and the fourth connecting section (2200) are further provided with a fourth auxiliary fixing portion (2500) for fixing the spirit bubble (3000).

8. The device for observing and positioning a sharpening angle of a cutting edge according to claim 7, wherein the second bracket (4000) is provided with an angle value scale (4300); and/or a side of the fifth connecting section (4100) corresponding to the second recess portion (4001) is provided with a plurality of tooth portions (4002); and/or a side of the sixth connecting section (4200) corresponding to the second recess portion (4001) is provided with a plurality of tooth portions (4002);
and/or one or two sides of the second connecting portion (2300) are provided with raised ribs (2301), the raised ribs (2301) matching the tooth portions (4002); and/or the second connecting portion (2300) is provided with an indicating portion (2600) for indicating an angle between the first bracket (2000) and the base (1000).

9. The device for observing and positioning a sharpening angle of a cutting edge according to claim 8, wherein a rear side of the fifth connecting section (4100) is provided with a fifth step portion (4105), and a rear side of the sixth connecting section (4200) is provided with a sixth step portion (4205); the first end (2101) of the third connecting section and one side of the second connecting portion (2300) form a third bump (2105), and the first end (2201) of the fourth connecting section and the other side of the second connecting portion (2300) form a fourth bump (2205); the third bump (2105) moves along the fifth step portion (4105), and the fourth bump (2205) moves along the sixth step portion (4205); the indicating portion (2600) comprises sharp indicating heads (2601) located at two ends of the indicating portion (2600), the two sharp indicating heads (2601) respectively corresponding to one raised rib (2301), and a horizontal indicating slot (2602) being provided between the two sharp indicating heads (2601); and the two sharp indicating heads (2601), the third bump (2105) and the fourth bump (2205) respectively form two dents (2700), the two raised ribs (2301) being located in the corresponding dents (2700).

10. The device for observing and positioning a sharpening angle of a cutting edge according to claim 9, wherein the second end (1102) of the first connecting section is provided with a first shaft hole (1103), the second end (1202) of the second connecting section is provided with a second shaft hole (1203), the first end (1101) of the first connecting section is provided with a third shaft hole (1104), and the first end (1201) of the second connecting section is provided with a fourth shaft hole (1204); the second end (2102) of the third connecting section is provided with a first shaft (2103), and the second end (2202) of the fourth connecting section is provided with a second shaft (2203), the first shaft (2103) matching the first shaft hole (1103), and the second shaft (2203) matching the second shaft hole (1203); an outer side of the first end (4101) of the fifth connecting section is provided with a third shaft (4103), and an outer side of the first end (4201) of the sixth connecting section is provided with a fourth shaft (4203), the third shaft (4103) matching the third shaft hole (1104), and the fourth shaft (4203) matching the fourth shaft hole (1204); and an outer end of the third shaft (4103) is provided with a third rectangular block (4104), an outer end of the fourth shaft (4203) is provided with a fourth rectangular block (4204), the first end (1101) of the first connecting section is provided with a third rectangular hole (1105), the third shaft hole (1104) is located at the middle of the third rectangular hole (1105), the first end (1201) of the second connecting section is provided with a fourth rectangular hole (1205), the fourth shaft hole (1204) is located at the middle of the fourth rectangular hole (1205), the third rectangular block (4104) is interlocked with the third rectangular hole (1105) in a staggered manner based on the third shaft (4103), and the fourth rectangular block (4204) is interlocked with the fourth rectangular hole (1205) in a staggered manner based on the fourth shaft (4203).

11. The device for observing and positioning a sharpening angle of a cutting edge according to claim 10, wherein a front side of the fifth connecting section (4100) is provided with the angle value scale (4300) for displaying the angle between the first bracket (2000) and the base (1000), a front side of the sixth connecting section (4200) is provided with a plurality of first bumps (4302), a first groove (4303) is formed between the adjacent first bumps (4302), and the first grooves (4303) correspond to angle values of different angles between the first bracket (2000) and the base (1000); a rear side of the first end (4101) of the fifth connecting section and a rear side of the first end (4201) of the sixth connecting section are connected via a third connecting portion (4400); and one or two sides of the fourth connecting portion (4500) are provided with a second groove (4501), and an inner side of the second end (1102) of the first connecting section and/or an inner side of the second end (1202) of the second connecting section are provided with a second protrusion portion (1500), the second protrusion portion (1500) matching the second groove (4501) to achieve a detachable connection between the fourth connecting portion (4500) and the base (1000).

12. The device for observing and positioning a sharpening angle of a cutting edge according to claim 11, wherein a side of the first connecting portion (1300) facing the first bracket (2000) is provided with a first recess (1301), and a side of the fourth connecting portion (4500) facing the base (1000) is provided with a fourth recess (4502), the first recess (1301) being in positional correspondence to the fourth recess (4502); and/or the first connecting section (1100) and the second connecting section (1200) are disposed in parallel, and/or the third connecting section (2100) and the fourth connecting section (2200) are disposed in parallel, and/or the fifth connecting section (4100) and the sixth connecting section (4200) are disposed in parallel; and/or the fifth step portion (4105) has an arc shape, and the third bump (2105) moves in an arc shape along the fifth step portion (4105); and/or the sixth step portion (4205) has an arc shape, and the fourth bump (2205) moves in an arc shape along the sixth step portion (4205); and/or an outermost side of the first connecting section (1100) is provided with two first highest points (1106), a straight line formed by a line connecting the two first highest points (1106) is parallel to the spirit bubble (3000), and the height of an outer end of the third rectangular block (4104) does not exceed the height of the first highest points (1106); and/or an outermost side of the second connecting section (1200) is provided with two second highest points (1206), a straight line formed by a line connecting the two second highest points (1206) is parallel to the spirit bubble (3000), and the height of an outer end of the fourth rectangular block (4204) does not exceed the height of the second highest points (1206); and/or the bottom of the base (1000) is in a plane parallel to the spirit bubble (3000); and/or the second end (1102) of the first connecting section and the second end (1202) of the second connecting section are both provided with an extension section extending outwards and an extension portion (1400) formed by the intersection of the two extension sections, a hanging hole (1401) being formed between the extension portion (1400) and the first connecting portion (1300), an outer side surface of the extension portion (1400) having a linear or planar shape, and the outer side surface of the extension portion (1400) being in a vertical state with the spirit bubble (3000); and/or a straight line formed by a line connecting the first end (1101) of the first connecting section and the first end (1201) of the second connecting section is parallel to the spirit bubble (3000); or the second bracket (4000) has a circular arc shape.

13. The device for observing and positioning a sharpening angle of a cutting edge according to claim 1, wherein the base (1000) is provided with a magnet (1003), or the base (1000) is provided with a clamp for fixing the base (1000) on the knife body, or the base (1000) is provided with a suction cup for fixing the base (1000) on the knife body, or the base (1000) is provided with an adhesive portion for fixing the base (1000) on the knife body; and/or the base (1000) is further provided with the hanging hole (1401); or the length, height and width of the device for observing and positioning a sharpening angle of a cutting edge do not exceed 8 cm.

* * * * *